(12) United States Patent  
Ishikawa et al.

(10) Patent No.: US 9,641,437 B2  
(45) Date of Patent: May 2, 2017

(54) PACKET RELAY DEVICE AND PACKET RELAY METHOD

(71) Applicant: ALAXALA Networks Corporation, Kawasaki, Kanagawa (JP)

(72) Inventors: Yuichi Ishikawa, Kawasaki (JP); Takao Nara, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 365 days.

(21) Appl. No.: 14/450,552

(22) Filed: Aug. 4, 2014

(65) Prior Publication Data

US 2015/0036688 A1    Feb. 5, 2015

(30) Foreign Application Priority Data

Aug. 5, 2013    (JP) .................................. 2013-162397  
Jun. 23, 2014   (JP) .................................. 2014-127842

(51) Int. Cl.  
*H04L 12/743* (2013.01)  
*H04L 12/721* (2013.01)  
*H04L 12/851* (2013.01)

(52) U.S. Cl.  
CPC .......... *H04L 45/7457* (2013.01); *H04L 45/38* (2013.01); *H04L 47/2441* (2013.01)

(58) Field of Classification Search  
CPC .. H04L 45/7457; H04L 45/38; H04L 47/2441  
See application file for complete search history.

(56) References Cited

U.S. PATENT DOCUMENTS

| | | | |
|---|---|---|---|
| 6,629,099 B2 | 9/2003 | Cheng | |
| 6,718,326 B2 * | 4/2004 | Uga | ........................ H04L 45/00 |
| 7,286,535 B2 * | 10/2007 | Ishikawa | ................. H04L 47/10 370/351 |
| 9,356,864 B2 * | 5/2016 | Sugawara | ............. H04L 45/745 |
| 2003/0189932 A1 | 10/2003 | Ishikawa et al. | |

FOREIGN PATENT DOCUMENTS

| | | |
|---|---|---|
| JP | 3936883 B2 | 3/2007 |
| JP | 2012-034192 A | 2/2012 |

* cited by examiner

*Primary Examiner* — Melvin Marcelo  
(74) *Attorney, Agent, or Firm* — Mattingly & Malur, PC

(57) ABSTRACT

A packet relay device has a packet receiving unit, a switch, a packet sending unit, an associative memory, and a packet search unit. The packet search unit has action registers which hold information specifying an action to be executed, holds address range information including consecutive address ranges of the associative memory and the action registers in association with each other, and registers a plurality of flow entries at a plurality of addresses in the same address range. The flow entries have conditions identifying the flows associated with the same action. The device inputs header information of the packets into the associative memory, determines the action to be executed in accordance with information read out from the action register corresponding to the address range including an address output from the associative memory, and executes the determined action.

12 Claims, 14 Drawing Sheets

FIG. 12

FLOW TABLE BEFORE SETTING

```
FLOW ENTRY 1: FLOW CONDITION A → ACTION 1
FLOW ENTRY 2: FLOW CONDITION B → ACTION 2
FLOW ENTRY 3: FLOW CONDITION C → ACTION 1
FLOW ENTRY 4: FLOW CONDITION D → ACTION 1
```

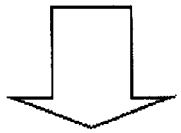

FLOW TABLE IN THIS EMBODIMENT

```
FLOW ENTRY 1: FLOW CONDITION A → ACTION 1
FLOW ENTRY 3: FLOW CONDITION C AND NOT B → ACTION 1
FLOW ENTRY 4: FLOW CONDITION D AND NOT B → ACTION 1
FLOW ENTRY 2: FLOW CONDITION B → ACTION 2
```

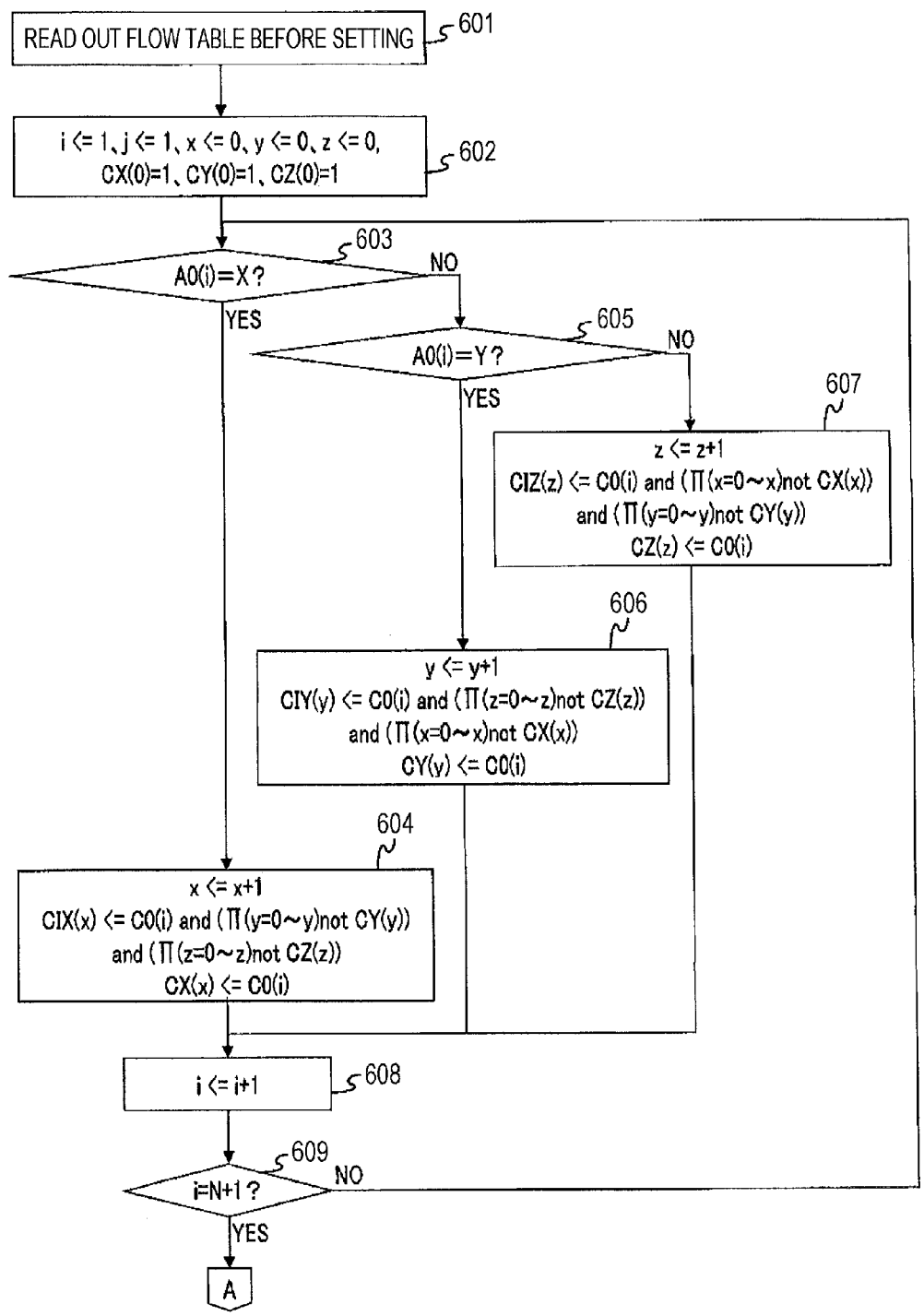

PACKET RELAY DEVICE AND PACKET RELAY METHOD

The present application claims priority from Japanese patent applications JP 2013-162397 filed on Aug. 5, 2013, and JP 2014-127842 filed on Jun. 23, 2014, and the content of which are hereby incorporated by reference into this application.

BACKGROUND OF THE INVENTION

1. Field of the Invention

The present invention relates to a packet relay device in networks.

2. Description of the Related Art

Packet relay devices include functions, such as filtering and QoS (Quality of Service), for specifying a process in association with each flow (for example, paragraph 0002 of JP-3936883-B1). A flow is an aggregation of packets that are identified based on conditions, such as input line numbers of packets and values of packet headers. To realize this function, upon reception of packets, the packet relay device executes a flow search for searching to which flow the received packets belong, and determines which process is to be performed for the packets.

Further, with the development of the packet relay devices, the flow search is required by a plurality of functions, in addition to the filtering and QoS. Examples of the functions include a monitoring function, such as mirroring and a flow statistics function (for example, paragraph 0005 of JP-2012-34192-A).

As described above, the packet relay devices tend to have many functions requiring the flow search. Thus, it is required to realize a high-speed technology of the flow search, not to lower the performance of the flow search, even if the number of these functions increases. Conventionally, the flow search has been realized at high speed by a CAM search using a search dedicated memory, so-called a CAM (Content Addressable Memory, associative memory) (JP-3936883-B1).

JP-2012-34192-A discloses a packet transfer device which has a CAM control unit, a CAM, a RAM control unit, and RAM. Specifically, a flow search CAM control unit 613 searches a flow search CAM 614 for a predetermined block, using at least one information item of header information items of received packets, as a search key, and executes a flow search for identifying a flow to which the packets belongs. For example, the flow search CAM control unit 613 executes a flow search for a block of the flow search CAM 614 which has been specified with reference to a search activation flag table 612. A flow process RAM control unit 615 searches flow process RAM 616, based on a hit address which has been obtained as a result of the flow search by the flow search CAM control unit 613. The flow process RAM 616 stores information regarding a flow process at an address corresponding to the flow search CAM 614. A flow process determining unit determines a flow process, based on the search result by the flow search CAM control unit 613 and the flow process RAM control unit 615.

When there are a plurality of flow entries matching with a CAM, the CAM preferentially outputs an address of a flow entry which is stored at a preceding address with a small value. Subsequently, a direction in which address values get small is called "preceding", a direction in which address values get large is called "following", a consecutive address range is called "an address space", an address with the smallest address value in the address space is called a "lower limit address", and an address with the largest address value in the address space is called an "upper limit address".

RAM (Random Access Memory) registers action entries with a description of a process to be performed for flows matching with the flow entries of addresses in the CAM. An acquired address in the CAM as a search result is converted into a read address of the RAM by the RAM control unit to read the RAM. By doing this, a determination is made as to which process is to be performed for the corresponding flow.

If the number of functions requiring the flow search increases, a table with registered flow conditions corresponding to the functions is stored in the CAM, in association with the increased number of functions. It is necessary to execute the flow search for the increased number of functions for one packet. Thus, the increase in the time of the flow search deteriorates the processing performance per packet.

U.S. Pat. No. 6,629,099 discloses a technique for solving this problem. According to this technique, there is provided a CAM which can execute a plurality of searches at the same time in response to one search command. Thus, even if the number of functions requiring the flow search increases, the flow search performance is not deteriorated. When the plurality of searches are executed in response to one search command, a plurality of search results can be obtained per search command.

However, in a CAM search, it is necessary to determine which process is to be performed for a corresponding flow, by reading the RAM in accordance with a search result. When the plurality of searches are executed in accordance with one search command, it is necessary to read the RAM for the plurality of search results. Thus, as the number of searches increases, the reading performance of the RAM will be a bottleneck. This causes a problem that the performance of the flow search is deteriorated.

This is because the RAM cannot output simultaneously all read commands acquired as a result of CAM search. In addition, the RAM outputs each read result in response thereto, thereafter performing a process for a next read command. That is, the RAM sequentially outputs read results in response to a plurality of read commands. The RAM cannot start a next process for packets, until the plurality of read results are completely output. Therefore, according to the technique of U.S. Pat. No. 6,629,099, even if the CAM search time is reduced, the time is not reduced in the RAM, thus lowering the performance of the flow search.

SUMMARY OF THE INVENTION

Objects of the present invention are to solve the above problem, and to provide a packet relay device which can keep performance of a flow search without lowering the performance, since reading performance of RAM is not a bottleneck, even if the number of searches to be executed in response to one search command increases due to an increased number of functions requiring the flow search.

The present invention was made to solve at least a part of the above problem, and the object can be achieved as the following mode or application example. There is provided a packet relay device which relays packets, including: a packet receiving unit which receives packets from an input line; a switch for switching the packets received by the packet receiving unit; a packet sending unit which sends the packets switched by the switch, through an output line; an associative memory which holds a plurality of flow entries with a set condition identifying a flow to which the packets belong, and, when header information of the input packets satisfies a condition of any of the flow entries, outputs an address of the flow entry with the satisfied condition; and a packet search unit which executes an action associated with the flow to which the packets belong, based on an output of the associative memory, and wherein the packet search unit has an action register which holds information specifying an action to be executed, holds address range information including consecutive address ranges of the associative memory and the action registers in association with each other, registers the plurality of flow entries with the conditions identifying the flows associated with the same action at a plurality of addresses in the same address range, inputs the header information of the packets to the associative memory, determines an address range including the address output from the associative memory, determines the action to be performed for the packets, in accordance with information read out from the action register corresponding to the determined address range, and executes the determined action.

According to the representative embodiment of the present invention, there is provided a packet relay device which can keep the performance of the flow search without lowering the performance, since reading performance of RAM is not a bottleneck, even if the number of searches to be executed in response to one search command increases due to an increased number of functions requiring the flow search.

BRIEF DESCRIPTION OF THE DRAWINGS

FIG. 12 is an explanatory diagram illustrating an example of sorting flow entries in the flow table in the embodiment of the present invention;

FIG. 13A is the first part of a flowchart illustrating an example of a process for sorting flow entries in the flow table in the embodiment of the present invention;

DESCRIPTION OF THE PREFERRED EMBODIMENT

Preferred embodiments of the present invention will be described in detail below with reference to the accompanying drawings.

Figure 1:
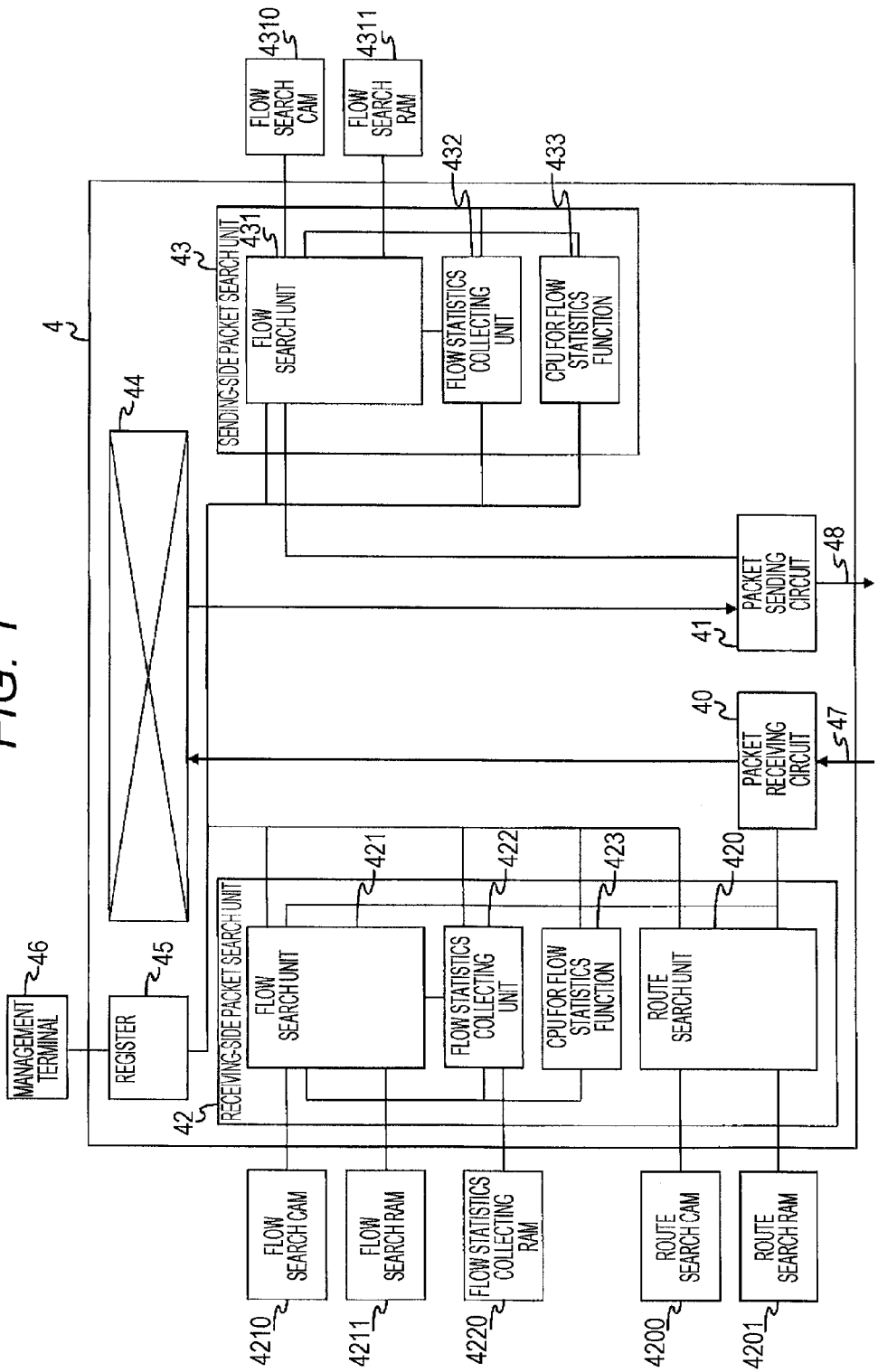
FIG. 1 is a block diagram illustrating a configuration example of a packet relay device in an embodiment of the present invention.

FIG. 1 is a block diagram illustrating a configuration example of a packet relay device 4 in an embodiment of the present invention.

The packet relay device 4 illustrated in FIG. 1 includes a packet receiving circuit 40, a packet sending circuit 41, a receiving-side packet search unit 42, a sending-side packet search unit 43, a switch 44, a register 45, and various memories. In the above packet relay device 4, those parts other than the various memories are formed with one or a plurality of ASICs, and the various memories may externally be attached thereto. The receiving-side packet search unit 42 includes a flow search unit 421, a flow statistics collecting unit 422, a CPU 423 for flow statistics function, and a route search unit 420. The sending-side packet search unit 43 includes a flow search unit 431, a flow statistics collecting unit 432, and a CPU for flow statistics function 433. The various memories include a flow search CAM 4210 and flow search RAM 4211 which are referred by the flow search unit 421, flow statistics collecting RAM 4220 referred by the flow statistics collecting unit 422, a route search CAM 4200 and route search RAM 4201 which are referred by the route search unit 420, and a flow search CAM 4310 and flow search RAM 4311 which are referred by the flow search unit 431. Descriptions will now be made to the overall of the packet relay device 4 and its constituent elements.

The packet relay device 4 is connected to a plurality of input lines 47 and a plurality of output lines 48, and outputs packets input from the input line 47 to the output line 48 specified based on header information. The packet relay device 4 is connected to a management terminal 46. Setting information for various tables as will be described later are input from the management terminal 46 and temporarily accumulated in a register 45, output to a control unit of each of the various tables, and set in each table. When the packets are input from the input line 47, the packet receiving circuit 40 stores the packets and outputs header information of the packets to the receiving-side packet search unit 42. Further, the packet receiving circuit 40 may add an input line number (or an identifier) for identifying the input line from which the packets are input and an internal header including a Byte length of the packets, to packet header information, and output them to the receiving-side packet search unit 42.

Of the input packet header information, the receiving-side packet search unit 42 outputs a destination IP address (DIP) to the route search unit 420. The route search unit 420 outputs the input destination IP address to the route search CAM 4200. The route search CAM 4200 stores a table in which a list of destination IP addresses are registered, and outputs the address of an entry which registers a destination IP address matching with the input destination IP address to the route search unit 420.

The route search unit 420 outputs the address input from the route search CAM 4200 to the route search RAM 4201. The route search RAM 4201 registers the output line for outputting the packets of the above-described destination IP address and a destination MAC address (DMAC) to be rewritten at the output, at the same address as the address of the route search CAM 4200 which has registered the destination IP address. The route search RAM 4201 is read out using the address input from the route search unit 420 as a readout address, thereby enabling to acquire the output line for outputting and the destination MAC address to be rewritten at the output.

The route search RAM 4201 outputs the output line and the destination MAC address to the route search unit 420. The route search unit 420 outputs the output line and the destination MAC address to the packet receiving circuit 40. The packet receiving circuit 40 registers information of the output line, of the internal header of the packet, and rewrites the destination MAC address, of the header information.

In parallel with the above-described route search process, the receiving-side packet search unit 42 outputs L2 (Layer2) information, L3 (Layer3) information, and L4 (Layer4) information, of the input packet header information, to the flow search unit 421. The flow search unit 421 outputs the L2 information, the L3 information, and the L4 information from the receiving-side packet search unit 42, of the packet header information, to the flow search CAM 4210. The flow search CAM 4210 stores a flow table 42100 which registers a list of flow entries. In each of the flow entries, a flow condition is set to define the flow using the L2 information, the L3 information, and the L4 information. The flow search CAM 4210 searches for a flow entry, in which a flow condition matching with the L2 information, the L3 information, and the L4 information of the input packets, and outputs an address of the matching flow entry to the flow search unit 421.

Descriptions will now be made to an embodiment of the present invention, using a flow statistics function, for example, NetFlow.

Figure 2:
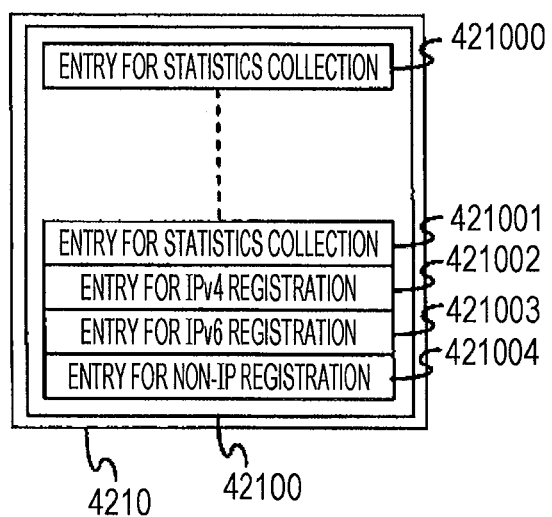
FIG. 2 is an explanatory diagram illustrating a configuration example of a flow table stored in a flow search CAM in the embodiment of the present invention.

FIG. 2 is an explanatory diagram illustrating a configuration example of the flow table 42100 stored in the flow search CAM 4210, in the embodiment of the present invention.

The flow table 42100 of FIG. 2 includes various flow entries, such as an entry 421000 for statistics collection, an entry 421001 for statistics collection, an entry 421002 for IPv4 registration, an entry 421003 for IPv6 registration, and an entry 421004 for non-IP registration. What is set in the entry 421000 for statistics collection is a flow condition matching with the individual flow for collecting the flow statistics. What is set in the entry 421002 for IPv4 registration is a flow condition matching with the entire IPv4 flows to be registered as targets for collecting the flow statistics. What is set in the entry 421003 for IPv6 registration is a flow condition matching with the entire IPv6 flows to be registered as targets for collecting the flow statistics. What is set in the entry 421004 for non-IP registration is a flow condition matching with the entire non-IP flows to be registered as targets for collecting the flow statistics.

One entry for registration may be provided without discriminating between the flows of IPv4/IPv6/non-IP. When the entry for registration is discriminated based on another condition, flow conditions corresponding to the respective conditions may be set. By discriminating the entries for registration, the CPU executing, for example, a registration process is independently provided for each entry for registration. This enables to distribute the load, or to independently set conditions of target flows to be registered or conditions for registration of the number of flows.

FIG. 2 illustrates only the two entries for statistics collection (that is, the entries for statistics collection 421000 and 421001). The actual flow table 42100 may include an arbitrary number of entries for statistics collection.

Descriptions will now be made to the schemes of the process flow by the flow statistics function. What is input to the packet relay device 4 is a flow condition as a target for statistics collection using the flow statistics function, from the management terminal 46. The input flow condition is temporarily accumulated in the register 45, and output to the CPU 423 for flow statistics function. The CPU 423 for flow statistics function sets a flow condition input from the register 45, in the entry 421002 for IPv4 registration of the flow table 42100 in the case of the IPv4 flows, in the entry 421003 for IPv6 registration of the flow table 42100 in the case of the IPv6 flow, and in the entry 421004 for non-IP registration of the flow table 42100 in the case of the non-IP flow. As will specifically be described later, the CPU 423 for flow statistics function sets entries with set actions corresponding to the entries for registration in the flow search RAM 4211 and entries for collecting the statistics corresponding to the entries for registration in the flow statistics collection RAM 4220.

When the packets (hereinafter referred to as corresponding packets) input to the packet relay device 4 do not match with any of the flow conditions of any of the entries, such as the entry 421000 for statistics collection (or the flow condition is not set in any of the entries for statistics collection), or when the corresponding packets match with the flow condition of any of the entry 421002 for IPv4 registration, the entry 421003 for IPv6 registration, and the entry 421004 for non-IP registration, a registration request regarding the flow to which the corresponding packets belongs is sent to the CPU 423 for flow statistics function. The CPU 423 for flow statistics function sets an address of an unused entry of the flow table 42100 in a manner that the entry 421000 for statistics collection of the flow table 42100 is determined as a matched entry more preferentially than entries for registration (that is, an address preceding than any other entries for registration, of addresses of unused entries), based on the packet header information of the corresponding packets. Subsequently, when those packets belonging to the same flow as that of the corresponding packets are input to the packet relay device 4, it is determined that the they match with the entry 421000 for statistics collection more preferentially than the entry for registration. Thus, the flow statistics collecting unit 422 executes a statistics collection process rather than a registration process.

Figure 3:
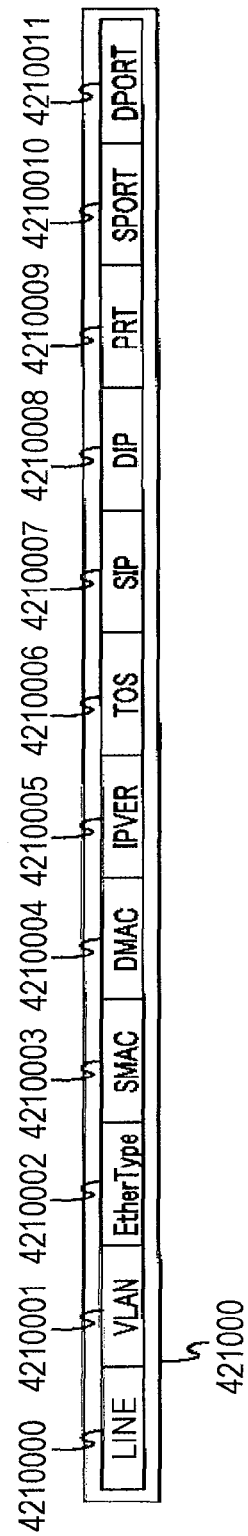
FIG. 3 is an explanatory diagram illustrating a configuration example of an entry for collecting statistics in the embodiment of the present invention.

FIG. 3 is an explanatory diagram illustrating a configuration example of the entry 421000 for statistics collection in the embodiment of the present invention.

The entry 421001 for statistics collection, the entry 421002 for IPv4 registration, the entry 421003 for IPv6 registration, and the entry 421004 for non-IP registration have also the same configuration as that of FIG. 3.

In the entry 421000 for statistics collection, formed as the flow conditions matching with the individual flows for collecting the flow statistics are a line 4210000, a VLAN 4210001, an EtherType 4210002, an SMAC (Source MAC Address) 4210003, a DMAC (Destination MAC Address) 4210004, an IPVER (IP Version) 4210005, a TOS (Type Of Service) 4210006, an SIP (Source IP Address) 4210007, a DIP (Destination IP Address) 4210008, a PRT (Protocol) 4210009, an SPORT (Source PORT) 4210010, and a DPORT (Destination PORT) 4210011.

The flow search unit 421 outputs an address output from the flow search CAM 4210 to the flow search RAM 4211.

Figure 4:
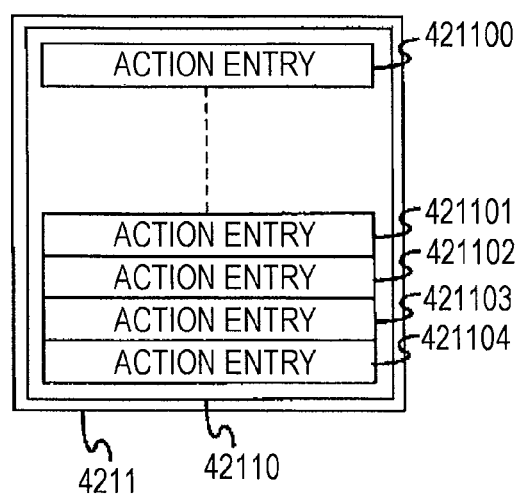
FIG. 4 is an explanatory diagram illustrating a configuration example of an action table stored in flow search RAM in the embodiment of the present invention.

FIG. 4 is an explanatory diagram illustrating a configuration example of an action table 42110 stored in the flow search RAM 4211 in the embodiment of the present invention.

The action table 42110 of FIG. 4 is formed of action entries 421100 to 421104. An action entry 4213 describing an action to be performed for the corresponding packets is registered, in accordance with the purpose of search, at the same address of the flow search RAM 4211 as the address of the flow search CAM 4210 which registers the flow entry with the registered flow condition matching with the L2 information, the L3 information, and the L4 information of the input packets.

Figure 5:
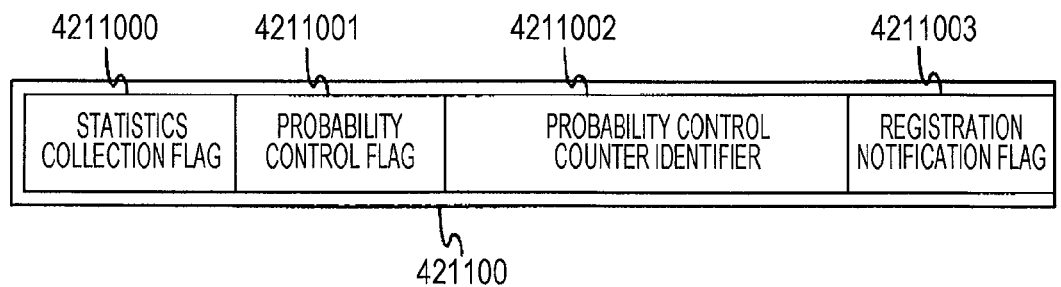
FIG. 5 is an explanatory diagram illustrating a configuration example of an action entry in the embodiment of the present invention.

FIG. 5 is an explanatory diagram illustrating a configuration example of the action entry 421100 in the embodiment of the present invention.

Registered in the action entry 421100 are a statistics collection flag 4211000 indicating an action as to whether flow statistics are to be collected, a probability control flag 4211001 indicating an action as to whether the flow statistics are to be probabilistically collected, a probability control counter identifier 4211002 at the time of collecting probabilistically the flow statistics, and a registration notification flag 4211003 indicating an action of informing the CPU 423 for flow statistics function that the corresponding packets are determined as target packets for collecting flow statistics and that a corresponding flow condition to identify the corresponding packets is to be registered as a flow entry.

The above is an example of a case in which the purpose of search is a flow statistics function. However, when the purpose of search is mirroring, some information is registered in the action entry 421100 (not illustrated). This information includes information indicating an action as to whether the corresponding packets are to be mirrored and also information indicating an action of probabilistically performing the flow statistics.

Alternatively, when the purpose of search is filtering, information indicating an action as to whether the corresponding packets are to be discarded is registered in the action entry 421100 (not illustrated).

When the purpose of search is priority determination of QoS, information indicating the priority of controlling the input packets in the device is registered in the action entry 421100.

Descriptions will now be made to a case in which the purpose of search is the flow statistics function. The flow search RAM 4211 is read out using, as a readout address, an address of the flow entry (input from the flow search unit 421) with a set flow condition which matches with the L2 information, the L3 information, and the L4 information of the corresponding packets. By this reading, it is possible to acquire information of the action entry 421100 indicating various actions regarding the collection of the flow statistics. Information of the action entry 421100 is output from the flow search RAM 4211 to the flow search unit 421. The flow search unit 421 outputs, to the flow statistics collecting unit 422, an address of the flow entry with a set flow condition matching with the L2 information, the L3 information, and the L4 information of the corresponding packets, and also information of the action entry 421100.

Figure 6:
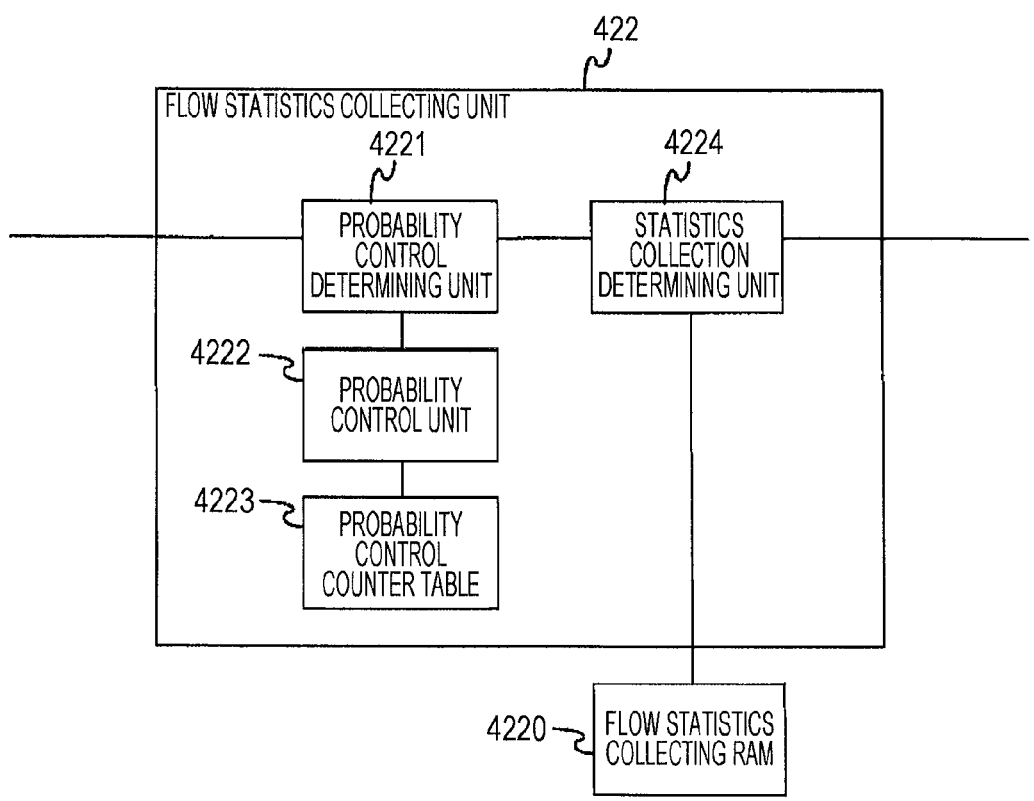
FIG. 6 is a block diagram illustrating a configuration example of a flow statistics-collecting unit in the embodiment of the present invention.

FIG. 6 is a block diagram illustrating a configuration example of the flow statistics collecting unit 422 in the embodiment of the present invention.

The flow statistics collecting unit 422 is configured with a probability control determining unit 4221, a probability control unit 4222, a probability control counter table 4223, and a statistics collection determining unit 4224. The flow statistics collecting unit 422 is connected to the flow statistics collecting RAM 4220.

The address of the flow entry with the set flow condition matching with the L2 information, the L3 information, and the L4 information of the corresponding packets, and the information of the action entry 421100 are input from the flow search unit 421 to the flow statistics collecting unit 422. Upon this input, the probability control determining unit 4221 determines that the collection of the flow statistics is probabilistically performed, when the probability control flag 4211001 included in the information of the action entry 421100 has a value representing to probabilistically perform the collection of the flow statistics. In addition, the unit 4221 determines that the collection of the flow statistics is not probabilistically performed, when the probability control flag 4211001 does not have a value representing to probabilistically perform the collection of the flow statistics.

When determined that the collection of the flow statistics is to be probabilistically performed, the probability control determining unit 4221 outputs the probability control counter identifier 4211002 in the information of the action entry 421100 to the probability control unit 4222. The probability control unit 4222 reads out the probability control counter table 4223 using the probability control counter identifier 4211002 as a readout address.

Figure 7:
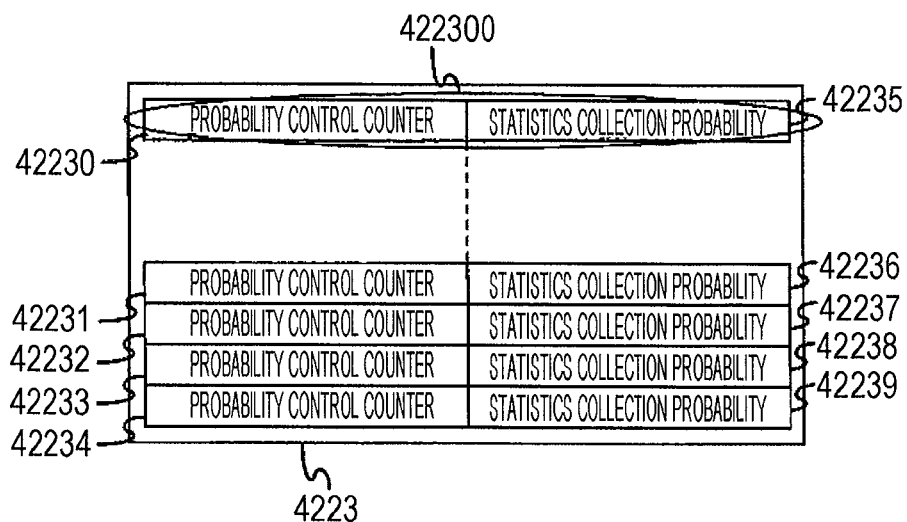
FIG. 7 is an explanatory diagram illustrating a configuration example of a probability control counter table in the embodiment of the present invention.

FIG. 7 is an explanatory diagram illustrating a configuration example of the probability control counter table 4223 in the embodiment of the present invention.

The probability control counter table 4223 is formed with a probability control entry 422300 which includes a probability control counter 42230 and a statistics collection probability 42235 in association with each probability control counter identifier 4211002. Every time the packets are input, the probability control counter 42230 and the statistics collection probability 42235 are read out by the probability control unit 4222, from the probability control counter table 4223. In the statistics collection probability 42235, a value from 0 to 100 is set in accordance with the probability 0 to 100%. The probability control unit 4222 calculates again the value from 0 to 100 with a unique probability every time the probability control counter is read out. Before the readout process of the probability control counter table 4223 for the next packets, the unit writes back the same address as the readout address for the corresponding packets into the probability control counter table 4223 as a write address.

The probability control counter 42230 and the statistics collection probability 42235 which are read out by the probability control unit 4222 are output to the probability control determining unit 4221. The probability control determining unit 4221 compares values of the probability control counter 42230 and the statistics collection probability 42235. When the probability control counter 42230 is equal to or lower than the statistics collection probability 42235, the unit 4221 outputs a signal representing that the statistics collection is performed for the corresponding packets to the statistics collection determining unit 4224. When the probability control counter 42230 is larger than the statistics collection probability 42235, the unit 4221 output a signal representing that the statistics collection is not performed for the corresponding packets to the statistics collection determining unit 4224. When determined in the probability control determining unit 4221 that the collection of the flow statistics is not probabilistically performed, the above process is not performed.

When the statistics collection flag 4211000 included in the information of the action entry 421100 has a value indicating that the statistics collection is to be performed, and when a signal indicating that the statistics collection is to be performed for the corresponding packets is input from the probability control determining unit 4221, the statistics collection determining unit 4224 performs the statistics collection for the corresponding packets. When the statistics collection flag 4211000 in the information of the action entry 421100 has a value indicating that the statistics collection is to be performed, and when it is determined that the collection of the flow statistics is not probabilistically performed in the probability control determining unit 4221, the unit performs the statistic collection for the corresponding packets. In any other cases, the statistics collection is not performed.

For example, when the probability control counter 42230 is read out in accordance with the probability control counter identifier 4211002, any one of 0 to 99 is calculated again as a value of a new probability control counter 42230. Because any one value of 0 to 99 is calculated again with a unique probability, when the value of, for example, the statistics collection probability 42235 is 50, the value of the probability control counter 42230 is equal to or lower than 50 with a probability of 50%. As a result, the collection of the flow statistics is performed with a probability of 50%.

FIG. 7 illustrates statistics collection probabilities 42235 to 42239 respectively corresponding to a plurality of probability control counters 42230 to 42234. For example, different values are set to the plurality of statistics collection probabilities 42235 to 42239, thereby enabling to collect the statistics with an arbitrary probability in association with each flow.

Descriptions will now be made to a statistics collection process in the statistics collection determining unit 4224. The statistics collection determining unit 4224 is connected to the flow statistics collecting RAM 4220.

Figure 8:
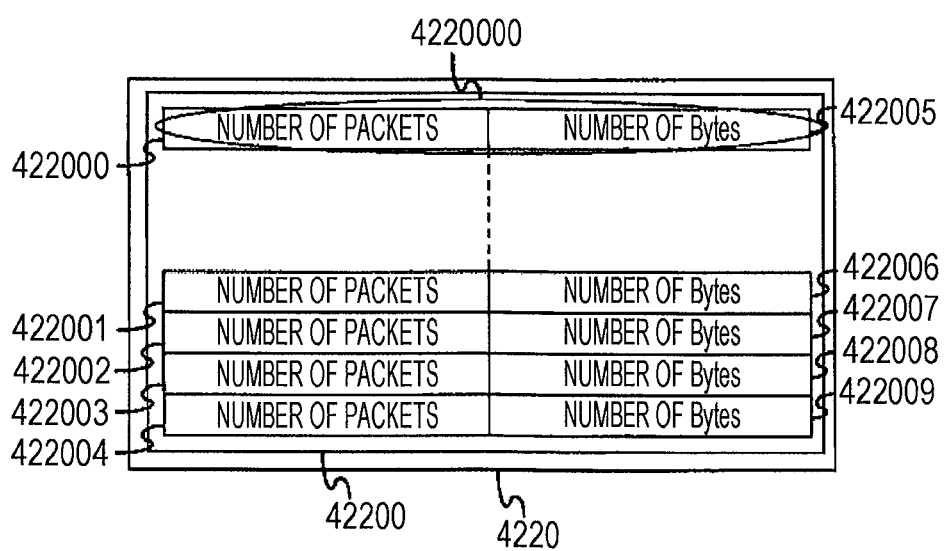
FIG. 8 is an explanatory diagram illustrating a configuration example of flow statistics-collecting RAM in the embodiment of the present invention.

FIG. 8 is an explanatory diagram illustrating a configuration example of the flow statistics collecting RAM 4220 in the embodiment of the present invention.

The flow statistics collecting RAM 4220 stores a flow statistics table 42200. The flow statistics table 42200 is formed with a statistics collecting entry 4220000 including fields for collecting a number 422000 of packets and a number of Bytes 422005, in association with each address of a flow entry (input from the flow search unit 421 to the flow statistics collecting unit 422) with a set flow condition matching with the L2 information, the L3 information, and the L4 information of the corresponding packets.

When the packets are input, the flow statistics collecting RAM 4220 is read out using, as a readout address, the address of the flow entry with a set flow condition matching with the L2 information, the L3 information, and the L4 information of the corresponding packets. Then, the number of packets 422000 and the number of Bytes 422005 of the flow to which the corresponding packets belongs are output to the statistics collection determining unit 4224. The statistics collection determining unit 4224 adds 1 to the read number of packets 422000, and adds the Byte length of the corresponding packets which is included in the internal header information added to the packet header information of the corresponding packets, to the read number of Bytes 422005. The statistics collection determining unit 4224 writes back the number of packets 422000 after added and the number of Bytes 422005 into the flow statistics collecting RAM 4220, using the same address as the readout address for the corresponding packets as a write address, before the readout process of the flow statistics collecting RAM 4220 for the next packets. As a result, the statistics collection process is completed in the statistics collection determining unit 4224.

FIG. 8 illustrates numbers of Bytes 422005 to 422009 respectively corresponding to the plurality of numbers of packets 422000 to 422004. Use of these numbers enables to perform the statistics collection in association with each flow.

Of the information of the action entry 421100 output to the statistics collection determining unit 4224, when the registration notification flag 4211003 has a value indicating that registration notification is to be performed, the flow statistics collecting unit 422 outputs the packet header information of the corresponding packets to the CPU 423 for flow statistics function. Then, the CPU 423 for flow statistics function searches the entry 421000 for statistics collection of the flow table 42100 stored in the flow search CAM 4210, for unused entries, and sets a flow condition matching with the corresponding packets, in the unused entry, based on the packet header information of the corresponding packets. The CPU 423 for flow statistics function registers the action entry 4213 for the corresponding packets, at the same address of the flow search RAM 4211 as the address of the corresponding entry 421000 for statistics collection with the set flow condition. The CPU 423 for flow statistics function registers the statistics collecting entry 4220000 for the corresponding packets, at the same address of the flow statistics collecting RAM 4220 as the address of the corresponding entry 421000 for statistics collection with the set flow condition.

Upon completion of the above process of the flow statistics function on the receiving side, the corresponding packets are output to the packet sending circuit 41 through the switch 44. When the packet header information is output to the sending-side packet search unit 43, the same process as the flow statistics function on the receiving side is executed also on the sending side. The flow statistics function may be executed on both or only either side of the receiving side or the sending side. For example, the flow search unit 431 may execute the same process as that of the flow search unit 421, by referring to the flow search CAM 4310 and the flow search RAM 4311. In accordance with a flow search result by the flow search unit 421, the flow statistics collecting unit 432 executes the same flow statistics process as that of the flow statistics collecting unit 422, and the CPU 433 for statistics function may execute the same various setting processes as those of the CPU 423 for flow statistics function. The following descriptions will be made onto the receiving-side packet search unit 42. However, the same may be applied to the sending-side packet search unit 43.

Descriptions will now be made to the flow search unit 421 of the receiving-side packet search unit 42, using FIG. 9.

Figure 9:
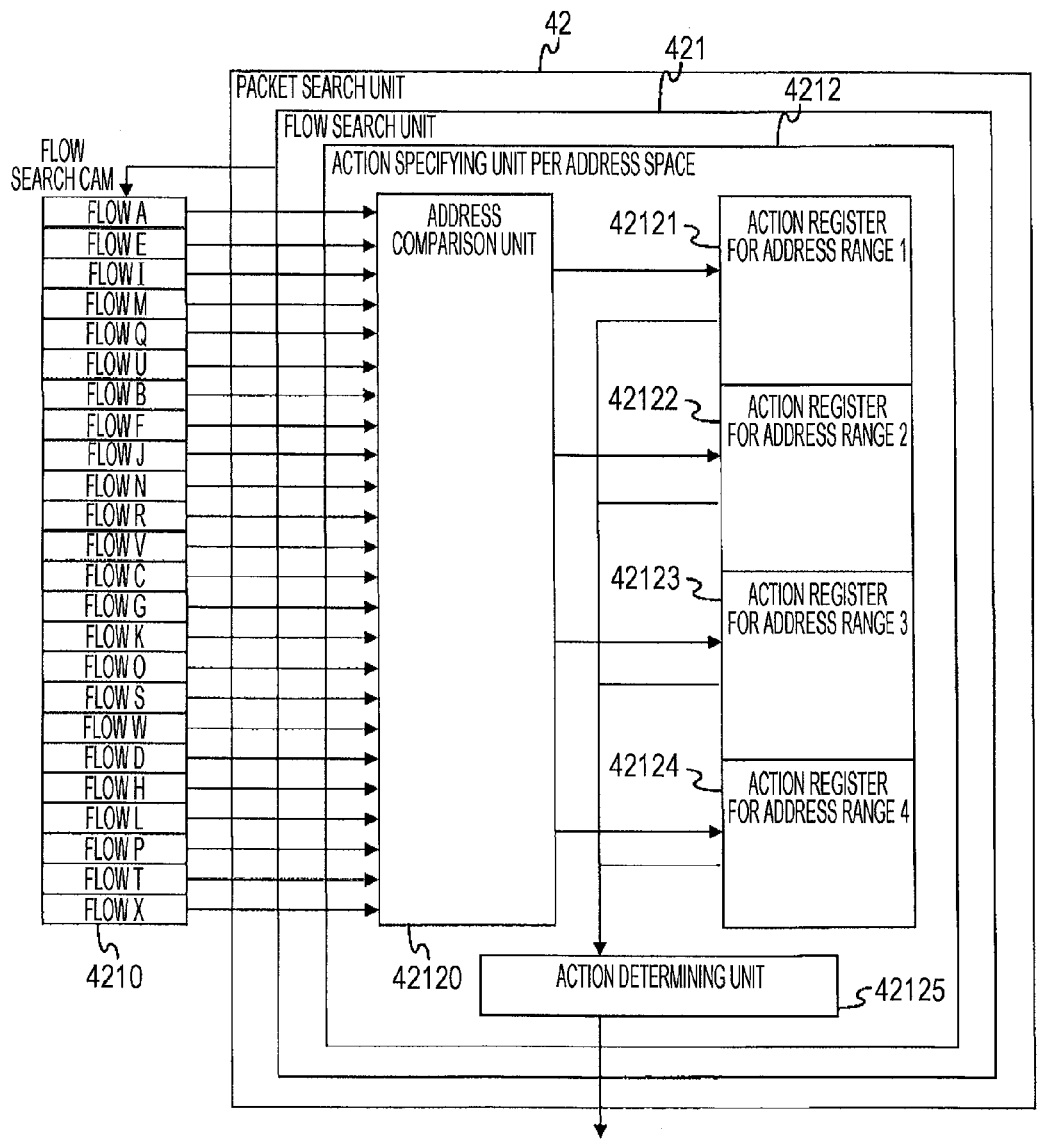
FIG. 9 is a block diagram illustrating a configuration example of a flow search unit in the embodiment of the present invention.

FIG. 9 is a block diagram illustrating a configuration example of the flow search unit 421 in the embodiment of the present invention. The flow search unit 421 includes an action specifying unit per address space 4212 in the embodiment of the present invention, an action register 42121 for address range 1 in the embodiment of the present invention, an action register 42122 for address range 2 in the embodiment of the present invention, an action register 42123 for address range 3 in the embodiment of the present invention, and an action register 42124 for address range 4 in the embodiment of the present invention. The address as a search result for the flow search CAM 4210 is output to an address comparison unit 42120 of the action specifying unit per address space 4212. The action register 42121 for address range 1 to the action register 42124 for address range 4 store the same information as the action entries specifying actions respectively corresponding to the address range 1 to the address range 4 (see FIG. 4 and FIG. 5).

Descriptions will now be made to the flow of a search process in the embodiment of the present invention. In the flow table in the flow search CAM 4210, the flow entries having the same action are arranged in a space with consecutive addresses in the list of flow entries inside the flow search CAM 4210. The sorting of the flow entries for realizing this flow table will specifically be described later (see FIG. 13A to FIG. 15). The address comparison unit 42120 holds information specifying the upper limit and the lower limit of the address ranges corresponding to the action register 42121 for address range 1, the action register 42122 for address range 2, the action register 42123 for address range 3, and the action register 42124 for address range 4.

Set in the action register for address range n (n: 1 to 4) are action entries corresponding to addresses equal to or greater than the lower limit and equal to or lower than the upper limit. The upper limit, the lower limit, and the actions are set by the CPU 423 for flow statistics function. The lower limit value corresponding to the action register 42121 for address range 1 is assumed to be L1, and its upper limit value is assumed to be U1. The lower limit value corresponding to the action register 42122 for address range 2 is assumed to be L2, and its upper limit value is assumed to be U2. The lower limit value corresponding to the action register 42123 for address range 3 is assumed to be L3, and its upper limit value is assumed to be U3. The lower limit value corresponding to the action register 42124 for address range 4 is assumed to be L4, and its upper limit value is assumed to be U4. It is assumed that the address ranges do not overlap with each other, and L1, U1, L2, U2, L3, U3, L4, and U4 are set to satisfy $L1 \leq U1 < L2 \leq U2 < L3 \leq U3 < L4 \leq U4$.

FIG. 9 illustrates a case in which there are four kinds of actions to be executed in accordance with the result of the flow search, by way of example. When there are N kinds of actions to be executed, an N number of the same action registers as the action registers 42121 for address range 1, and there are set the upper limit value and the lower limit value of the address range corresponding to each action register.

Figure 10:
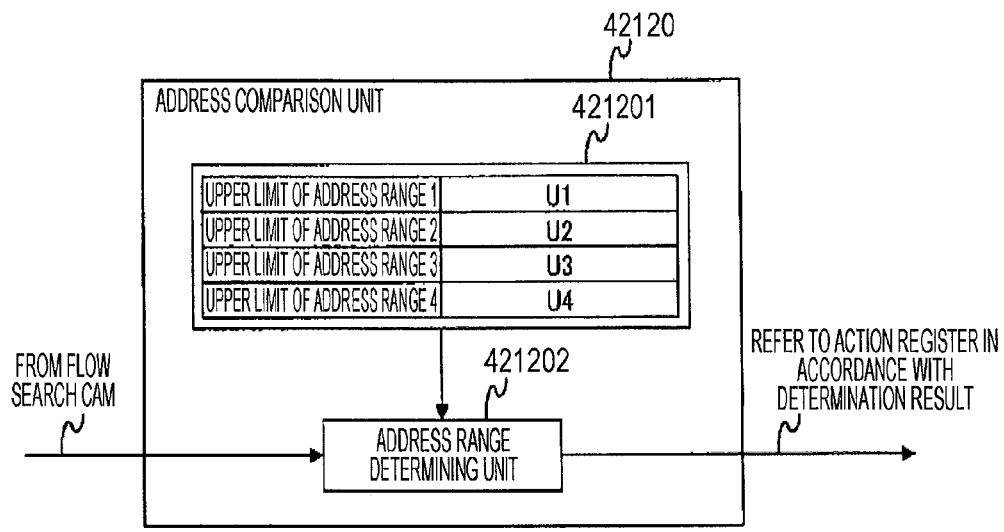
FIG. 10 is a block diagram illustrating a configuration example of an address comparison unit in the embodiment of the present invention.

FIG. 10 is a block diagram illustrating a configuration example of the address comparison unit 42120 in the embodiment of the present invention.

The address comparison unit 42120 includes an address range table 421201 and an address range determining unit 421202. The address range table 421201 includes information specifying the upper limit value and the lower limit value of each address range and also information including the address ranges and action registers in association with each other. Because the address with a small value is a preceding address, the upper limit value of one address range corresponds to the least significant address of its address range.

In the example of FIG. 10, the upper limit values U1 to U4 of the respective address ranges are set in the address range table 421201. In this example, the setting of the lower limit value of each address range is omitted. However, information of the above-described lower limit values L1 to L4 may further be included in the address range table 421201, or the address on the following side of the upper limit value of one address range may be handled as the lower limit value of the address range adjacent to the following side of its address range. In this case, the lower limit value of the most significant address range 1 is the most significant address of the flow search CAM 4210. The setting of the upper limit value U4 of the least significant address range 4 may be omitted. In this case, the upper limit value of the address range 4 is the least significant address of the flow search CAM 4210.

In this example, the address range registered in the head entry of the address range table 421201 (that is, the address range whose upper limit value is U1) corresponds to the action register 42121 for address range 1. Similarly, the address ranges registered in the second to fourth entries of the address range table 421201 respectively correspond to the action register 42122 for address range 2 to the action register 42124 for address range 4.

The address range determining unit 421202 compares the upper limit value and lower limit value of each address range registered in the address range table 421201, with the address input to the address comparison unit 42120, to determine in which address range the input address is included.

Descriptions will now be made to a process executed by the address comparison unit 42120, with reference to FIG. 9 and FIG. 10.

The flow search unit 421 inputs packet header information of target packets to be searched for a flow search to the flow search CAM 4210. The flow search CAM 4210 searches for a flow entry with a set flow condition matching with the L2 information, the L3 information, and the L4 information of the input packets, and outputs the address of the matching flow entry to the address comparison unit 42120 inside the action specifying unit per address space 4212 of the flow search unit 421. The address input from the above flow search CAM 4210 is noted as an ADR.

The address range determining unit 421202 of the address comparison unit 42120 compares the ADR with L1, U1, L2, U2, L3, U3, L4, and U4 in magnitude, as the upper limit value and lower limit value of the address ranges corresponding to the action registers for address range "n". The unit determines this address corresponds to which action register for address range "n". If $L1 \leq ADR \leq U1$, the address range determining unit 421202 reads out an action for the ADR from the action register 42121 for address range 1. If $L2 \leq ADR \leq U2$, the unit reads out an action for the ADR from the action register 42122 for address range 2. If $L3 \leq ADR \leq U3$, it reads out an action for the ADR from the action register 42123 for address range 3. If $L4 \leq ADR \leq U4$, it reads out an action for the ADR from the action register 42124 for address range 4. According to the above process, the action to be executed for the ADR of the corresponding packets is read out, and the action determining unit 42125 determines the action to be executed for the corresponding packets. Then, the determined action is output to the flow statistics collecting unit 422.

Figure 11:
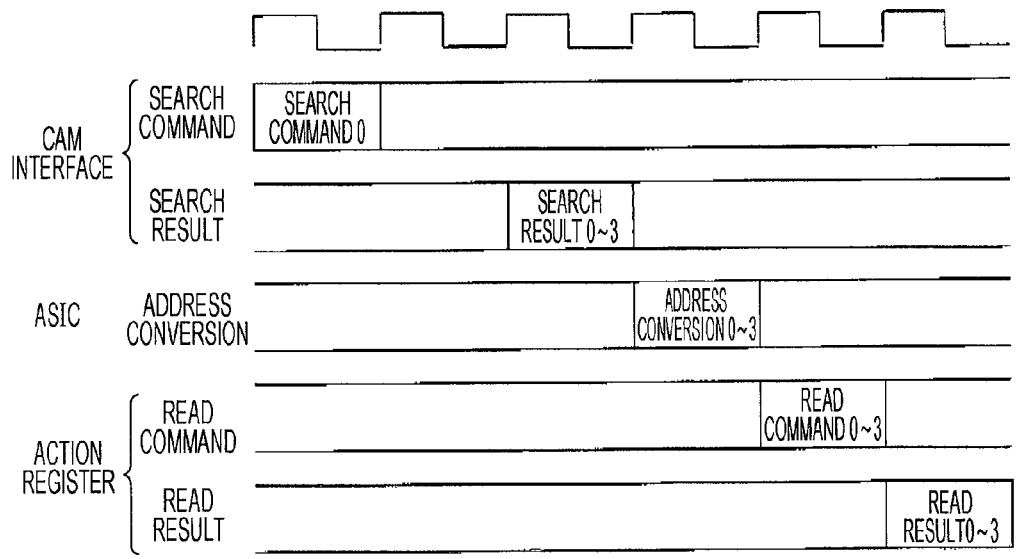
FIG. 11 is a time chart of a process executed by the packet relay device in the embodiment of the present invention.

FIG. 11 is a time chart of a process executed by the packet relay device 4 in the embodiment of the present invention. Specifically, FIG. 11 relates to the above process, and is a time chart of a process, since the packet header information of target packets to be searched in the flow search is input from the flow search unit 421 to the flow search CAM 4210, until the action register for address range "n" is read out.

Descriptions will now be made to an effect of speeding up of the flow search performance, according to this embodiment.

A comparison is made between a case in which the action table formed with action entries is stored in RAM, and a case in which action entries for each address range are stored in the action register for address range "n" like this embodiment.

When the action table formed with the action entries is stored in the RAM, the performance bottleneck is the number of times the RAM is read out just as many as the number of types of functions of the flow search. As illustrated in FIG. 11, the same number of registers as the number of functions requiring the flow search may be installed, in the ASIC for forming the flow search unit 421. This enables to solve the performance bottleneck without changing the number of times of the reading out, even if the number of types of functions increases.

For easy descriptions, FIG. 9 illustrates a flow table of the flow search CAM 4210 corresponding to one (for example, a flow statistics function) of a plurality of functions requiring the flow search and also the action specifying unit per address space 4212 corresponding thereto. However, in fact, as described above, when there are, for example, four functions requiring the flow search, the flow search CAM 4210 includes four flow tables, and four search results can be output in response to one search command.

In this case, the flow search unit 421 may have four action specifying units for per address space 4212 corresponding to the respective functions (corresponding to the respective flow tables). In each flow table, flow entries having the same action are arranged in a space with consecutive addresses in a list of the flow entries in the flow search CAM 4210. The action specifying unit per address space 4212 has a plurality of action registers corresponding to actions to be executed by the respective functions. Address ranges are set in association with the action registers.

As a result, upon acquisition of four search results from the flow search CAM 4210, four action specifying units 4212 for per address space parallelly issue a read command for an action register in accordance with the respective search results, acquire read results, and can determine the action. This enables to reduce the processing time for one packet, as illustrated in FIG. 11.

As described above, when the plurality of action specifying units per address space 4212 are prepared to correspond respectively to the plurality of functions, the flow search RAM 4211 is not necessary. However, it is possible to use a combination of one or more action specifying units 4212 per address space and the flow search RAM 4211. For example, the flow search unit 421 has one action specifying unit 4212 corresponding to only one function (for example, a flow statistics function) of the four functions. Like the conventional cases, the flow search RAM 4211 may be used for other functions (for example, filter, QoS, and mirroring). In this case, for filter, QoS, and mirroring, the reading needs to be sequentially performed from the flow search RAM 4211. However, for the flow statistics function, the action register may be referred, parallelly with the search of the flow search RAM 4211 for other functions. This enables to reduce the processing time.

In U.S. Pat. No. 6,629,099, if numbers of RAM to be externally attached are added as many as the number of functions requiring the flow search, it is possible to parallelly read out the action entry for each function. Therefore, it is possible to solve the performance bottleneck based on the number of times of reading. In this case, however, a plurality of RAM may externally be attached to the ASIC. To externally connect the RAM to the ASIC, the connection needs to be made using external pins of the ASIC. Thus, if the plurality of RAM are externally attached thereto, many pins are required, thus increasing the cost. On the other hand, when the action entries are stored in the register like this embodiment, this problem does not occur, because the external pins are not necessary.

Many entries cannot be stored in the register, unlike the RAM. In the case of the RAM, it is necessary to register many action entries, because action entries are registered in association with each address. In the case of the register in this embodiment, however, there is no need to register many action entries, because action entries are registered in association with each address range. Therefore, it is not a problem that many entries cannot be stored. Particularly, when the use of the flow search mechanism is the flow statistics function, the number of types of actions is limited to an extent of "whether to collect statistics"ב"whether to notify registration"ב"number of CPUs for registration"×"number of kinds of rates in probability control". This implies that, even if quite many action entries are stored in one action table 42110 inside the flow search RAM 4211, the contents are actually the same in many parts therein. Thus, by putting the plurality of action entries with the same contents into one register, the number of action entries to be stored in the register is much smaller than the number of action entries to be registered in the RAM. Thus, the flow statistics function is suitable as a target to which this embodiment is applied.

Descriptions will now be made to a method for setting the flow condition of the flow entry, in this embodiment. FIG. 12 is an explanatory diagram illustrating an example of sorting the flow entries in the flow table in the embodiment of the present invention.

In the flow table before the setting:

Flow entry 1 (flow search CAM address 1): flow condition A→action 1

Flow entry 2 (flow search CAM address 2): flow condition B→action 2

Flow entry 3 (flow search CAM address 3): flow condition C→action 1

Flow entry 4 (flow search CAM address 4): flow condition D→action 1.

The preferential relation of the flow entries is

Flow entry 1>flow entry 2>flow entry 3>flow entry 4 (That is, the priority of the flow entry 1 is the highest, while the priority of the flow entry 4 is the lowest).

According to the embodiment of the present invention, the flow entries involving the actions 1 and 2 are arranged in consecutive address ranges of the flow search CAM, and it is necessary to rearrange them as follows:

Flow entry 1 (flow search CAM address 1): flow condition A→action 1

Flow entry 3 (flow search CAM address 2): flow condition C→action 1

Flow entry 4 (flow search CAM address 3): flow condition D→action 1

Flow entry 2 (flow search CAM address 4): flow condition B→action 2.

In this example, in any combinations, the flow conditions A to D are exclusive from each other, and one packet never satisfies a plurality of conditions at the same time. Even if the flow entries are rearranged as described above, the action to be executed is not changed. For example, when packets satisfying the flow condition C are input, the packets do not satisfy any of the flow conditions A, B, nor D. Thus, the action 1 is inevitably executed, regardless of in which order the flow entries are registered.

In at least one combination, when some flow conditions A to D are not exclusive from each other, some action to be executed may be changed, because the flow entries are rearranged. For example, when a packet satisfying both of the flow conditions B and C is input, the flow condition B is determined, if it is before the rearrangement of the flow entries. In this case, the action 2 is executed. However, the flow condition C is determined, if it is after the arrangement of the flow entries. In this case, the action 1 is executed.

For example, when the flow entry 2 is one entry for statistics collection in FIG. 2, and when the flow entry 3 is one entry for registration in FIG. 2, the statistics collection to be originally executed will not be executed, because the action is changed due to the above-described rearrangement.

For the purpose of avoiding the change of the action due to the rearrangement of the flow entries, to maintain the preferential relation between the flow entries, it is necessary that the packet matching with the flow condition B should not match with any flow condition of the flow entry 3 and the flow entry 4. Thus, the flow conditions are necessarily changed as follows:

Flow entry 1 (flow search CAM address 1): flow condition A→action 1

Flow entry 3 (flow search CAM address 2): not flow condition B and flow condition C→action 1

Flow entry 4 (flow search CAM address 3): not flow condition B and flow condition D→action 1

Flow entry 2 (flow search CAM address 4): (not flow condition C and not flow condition D) and flow condition B→action 2

Note that the conditions "(not flow condition C and not flow condition D) and" of the flow entry 2 may be omitted. In this manner, the flow conditions of the flow entries after application of the present invention are exclusive from each other. This is the flow table of the present invention of FIG. 12, and the above is the flow of a process for setting the flow table based on the flow table before the setting.

Generally, when there is a condition to be added to the logical expression of the flow condition, like the flow entry 3 and the flow entry 4, and the flow condition includes a range specification, the number of entries to be developed on the flow search CAM 4210 increases. For example, when the flow condition B is 5 (101 in binary notation), and when the flow condition C is 4 to 7 (1xx in binary notation, where "x" represents "don't care", that is, represents an arbitrary value), "not flow condition B and flow condition C" is 4, 6, and 7. The entry, which is generated by developing this in binary notation with bits on the flow search CAM 4210, is increased to two entries, 100 and 11x.

The packet relay device 4 may output information representing the number of unused flow entries included in the flow search CAM 4210 (that is, the number of entries without a set flow condition, and which can accept the flow condition to be set now on). Then, the management terminal 46 may display this information on an image display device (not illustrated). Normally, if it is clear which flow condition is set, it can be estimated how many flow entries are consumed to set this flow condition. As described above, as a result that the flow entries are rearranged, and that the flow conditions are changed in accordance with the rearrangement, many flow entries may be consumed than before the rearrangement of the flow entries. Thus, it is possible to estimate whether the flow conditions are changed based on the number of unused flow entries. For example, when the user explicitly sets some flow conditions, it is possible to obtain the number of flow entries to be consumed based on the flow conditions. However, when more flow entries are actually consumed than the number of flow entries, it is possible to estimate that the flow entries have been rearranged and that the flow conditions have been changed.

Figure 13B:
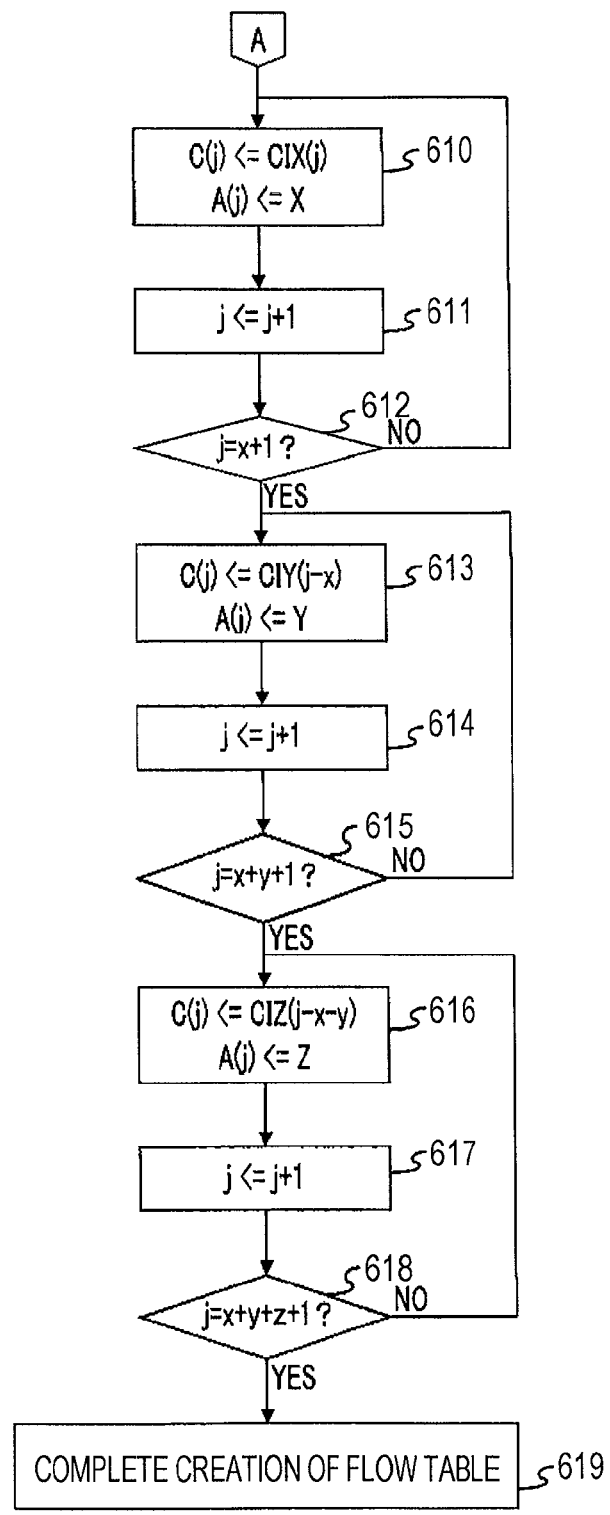
FIG. 13B is the second part of the flowchart illustrating the example of a process for sorting flow entries in the flow table in the embodiment of the present invention.

FIG. 13A and FIG. 13B are flowcharts each illustrating an example of a process for rearranging flow entries in the flow table in the embodiment of the present invention.

Specifically, FIG. 13A and FIG. 13B generalize the flow of the process for rearranging the flow entries illustrated in FIG. 12. In FIG. 13A and FIG. 13B, the number of flow entries is N, and three types of actions are X, Y, and Z. Flow entry numbers of the flow table before the setting are assumed as "i=1 to N". In this case, the flow entry numbers of the flow table before the setting are values representing the priority orders of the flow entries (that is, the priority orders of the flow conditions set in the respective flow entries), and are equal to address values of the flow entries in the flow search CAM 4210 before rearrangement is performed, as will be described later. A flow condition of a flow entry "i" is C0(i) in the flow table before the setting. An action corresponding to the flow entry "i" is A0(i) in the flow table before the setting. Flow entry numbers of a flow table, in which this embodiment is applied to the flow table before the setting, are assumed as "j=1 to N". In this case, the flow entry numbers may be addresses of the flow entries in the flow search CAM after rearrangement. As described above, if the flow condition includes a range specification, the number of flow entries generally increases after the application of this embodiment. For the sake of simple descriptions, let it be assumed that the number of flow entries is not to increase.

The flow condition of a flow entry j is assumed as C(j) in the flow table after the application of this embodiment. The action of the flow entry "j" is assumed as A(j) in the flow table after the application of this embodiment. The number of flow entries of X flow entries including only flow entries corresponding to an action X and their flow entry numbers are assumed as x. The number of flow entries of Y flow entries including only flow entries corresponding to an action Y and their flow entry numbers are assumed as y. The number of flow entries of Z flow entries including only flow entries corresponding to an action Z and their flow entry numbers are assumed as z. A flow condition of the flow entry x, as the action X, is assumed as CX(x). A logical product of x=0 to x, in relation to CX(x) is assumed as $\Pi(x=0$ to x). An intermediate state of the flow condition in the flow entry x for applying this embodiment thereto is assumed as CIX(x). An intermediate state of the flow condition in the flow entry y for applying this embodiment thereto is assumed as CIY(y). An intermediate state of the flow condition in the flow entry z for applying this embodiment thereto is assumed as CIZ(z).

Descriptions will now be made to the flow of the process of FIG. 13A and FIG. 13B, as an example of the flowchart in which the present invention is applied to the flow table before the setting.

The CPU 423 for flow statistics function starts a process for applying the present invention to the flow table before setting (Step 601). First, the CPU 423 for flow statistics function initializes as i=1, j=1, x=0, y=0, z=0, CX(0)=1, CY(0)=1, and CZ(0)=1 (Step 602). Next, the CPU 423 for flow statistics function determines whether A0(i)=X (Step 603).

When a determination result in Step 603 is YES, the CPU 423 for flow statistics function adds 1 to x, and assumes, as CIX(x), a condition in which multiplication is performed on C0(i) and a logical product of a negative condition of the flow condition in the flow entry corresponding to the action Y or Z, of the flow entries with a higher priority than that of the flow entry "i". That is, CIX(x) is obtained, based on CIX(x)<=C0(i) and (II(y=0 to y) not CY(y)) and (II(z=0 to z) not CZ(z)). Further, for calculations of CIY(y) and CIZ(z) in relation to the action Y and the action Z, the CPU 423 for flow statistics function assumes CX(x) as C0(i) (Step 604).

When the determination result in Step 603 is NO, the CPU 423 for flow statistics function determines whether A0(1)=Y (Step 605). When the determination result in Step 605 is YES), the CPU 423 for flow statistics function adds 1 to y, and assumes, as CIY(y), a condition in which multiplication is performed on C0(i) and a logical product of a negative condition of the flow condition in the flow entry corresponding to the action Z or X, of the flow entries with a higher priority than that of the flow entry "i". That is, CIY(y) is obtained, based on CIY(y)<=C0(i) and (II(z=0 to z) not CZ(z)) and (II(x=0 to x) not CX(x)). Further, for calculations of CIZ(z) and CIX(x) in relation to the action Z and the action X, the CPU 423 for flow statistics function assumes CY(y) as C0(i) (Step 606).

When a determination result in Step 605 is NO, the CPU 423 for flow statistics function adds 1 to z, and assumes, as CIZ(z), a condition in which multiplication is performed on C0(i) and a logical product of a negative condition of the flow condition in the flow entry corresponding to the action X or Y, of the flow entries with a higher priority than that of the flow entry "i". That is, CIZ(z) is obtained, based on CIZ(z)<=C0(i) and (II (x=0 to x) not CX(x)) and (II (y=0 to y) not CY(y)). Further, for calculations of CIX(x) and CIY(y) in relation to the action X and the action Y, the CPU 423 for flow statistics function assumes CZ(z) as C0(i) (Step 607).

Upon completion of this process, the CPU 423 for flow statistics function adds 1 to i (Step 608). Next, the CPU 423 for flow statistics function determines whether i=N+1 (Step 609). When a determination result in Step 609 is NO, the CPU 423 for flow statistics function repeats procedures from and after the determination procedure of Step 603.

When the determination result in Step 609 is YES, the CPU 423 for flow statistics function assumes C(j)=CIX(j) and also A(j)=X (Step 610). The CPU 423 for flow statistics function adds 1 to j (Step 611). The CPU 423 for flow statistics function determines whether j=x+1 (Step 612). When a determination result in Step 612 is NO, the CPU 423 for flow statistics function repeats procedures from and after Step 610.

When a determination result in Step 612 is YES, the CPU 423 for flow statistics function assumes C(j)=CIY(j−x) and also A(j)=Y (Step 613). Next, the CPU 423 for flow statistics function adds 1 to j (Step 614). The CPU 423 for flow statistics function determines whether j=x+y+1 (Step 615). When a determination result in Step 615 is NO, the CPU 423 for flow statistics function repeats procedures from and after Step 613.

When the determination result in Step 615 is YES, the CPU 423 for flow statistics function assumes C(j)=CIZ(j−x−y) and also A(j)=Z (Step 616). The CPU 423 for flow statistics function adds 1 to j (Step 617). The CPU 423 for flow statistics function determines whether j=x+y+z1 (Step 618). When a determination result in Step 618 is NO, the CPU 423 for flow statistics function repeats procedures from and after Step 616.

When the determination result in Step 618 is YES, the process of creating the flow table in this embodiment is completed (Step 619).

For the sake of easy descriptions, FIG. 13A and FIG. 13B illustrate an example of a process for registering flow entries in either one of three address ranges. As illustrated in FIG. 9, when four actions are defined, and when four address ranges are set to correspond to them, the same divergence of Step 603 or 605 is added, and its associated set of procedures as Step 604, 606, or 607 are added, into the process of FIG. 13A. In addition, the process of FIG. 13B is also changed in accordance with these additions. If the number of actions to be defined increases, the corresponding change is necessary. In any case, the scheme of the process to be executed will be understood from FIG. 13A and FIG. 13B. The same applies also to FIG. 14A, FIG. 14B, and FIG. 15.

According to the process of FIG. 13A and FIG. 13B, the flow entries of the flow table in the flow search CAM 4210 can be rearranged, in a manner that the flow entries corresponding to the same action are registered in the same address range. In this manner, it is possible to hold the action entries in association with each address range of the flow entries, instead of with each flow entry. Because the amount of information to be held radically decreases, the same information as the action entries can be held in the action register inside the ASIC. Thus, the speeding up of the process is realized by executing the process for determining an action to be executed in association with a plurality of functions, without increasing the number of RAM to be attached.

Further, by this rearrangement, when a flow entry (referred to as a flow entry 1) with a lower priority is registered at an address of a rank preceding a flow entry with a higher priority (referred to as a flow entry 2), a newly generated flow condition is set in the flow entry 1. In this case, the new flow condition is generated by removing an overlapped part of a flow condition (referred to as a flow condition 1) set in the flow entry 1 and a flow condition (referred to as a flow condition 2) set in the flow entry 2, from the flow condition 1.

For example, when the above-described flow condition 1 and the flow condition 2 are the flow condition C and the flow condition B in the example of FIG. 12, the above new flow condition is "flow condition C and not B". In this manner, by changing the flow condition, the flow conditions set in two flow entries are exclusive from each other, in which the hierarchical relationship of the priorities and the hierarchical relationship of the address ranks in the flow search CAM 4210 are changed the other way around. The action to be executed is not influenced by the rearrangement of the flow entries.

As described above, addresses of the flow entries after the rearrangement through the process of FIG. 13A and FIG. 13B does not represent the priorities of the flow entries. Thus, the packet relay device 4 continues to hold information representing the priorities of the flow entries, also after the execution of the rearrangement. Specifically, for example, the packet relay device 4 may hold information representing the contents of the flow entries in the flow table and their addresses before the execution of the rearrangement (that is, the hierarchical relationship of the addresses represents the hierarchical relationship of the priorities of the flow entries), in any of the RAM of FIG. 1 or non-illustrative RAM. This information may be referred when a new flow entry is added in the flow table (see FIG. 14A).

The flow conditions may be exclusive from each other, in all of the combinations of the flow entries in the flow table before the rearrangement. For example, in the case of a flow table for use in the flow statistics function (typically including NetFlow), conditions for identifying a target flow to be monitored are set in the entries for statistics collection, as illustrated in FIG. 2.

As described with reference to FIG. 2, when the input packets do not satisfy the flow condition of any of the entries for statistics collection, but satisfy the flow condition of the entry 421002 for IPv4 registration, at least a part of the header information of the corresponding packets are set as a flow condition of a new entry for statistics collection. As a result, the flow conditions of all of the combinations of the statistics collection in the flow table 42100 are exclusive from each other.

That is, one input packet may not satisfy the flow condition of any of the entries for statistics collection, and it may satisfy the flow condition of any of the entries for statistics collection. However, the input packet does not possibly satisfy the flow conditions of a plurality of entries for statistics collection. Thus, for example, when to rearrange only a plurality of entries 421000 to 421001 for statistics collection in the flow table 42100, there is no need to change the flow condition set in the entries for statistics collection.

Generally, however, in the flow table for searching for a target flow for QoS or filtering, there exists some combination of flow entries with flow conditions which are not exclusive from each other. In this flow table, the flow condition is changed as described above.

FIG. 13A and FIG. 13B are executed by the CPU 423 for flow statistics function. This is because the illustrations illustrate an example in which the determination of an action based on the address range is applied to the flow statistics function, in the embodiment of the present invention. The present invention may be applied to other functions, for example, a non-illustrative QoS function or a filtering function. In this case, a non-illustrative CPU for QoS function and a CPU for filtering function may execute the same processes as the above, or simply one CPU may execute the same processes as the above for a plurality of functions. The same applies to processes illustrated in FIG. 14A, FIG. 14B, and FIG. 15, as will be described later.

Figure 14A:
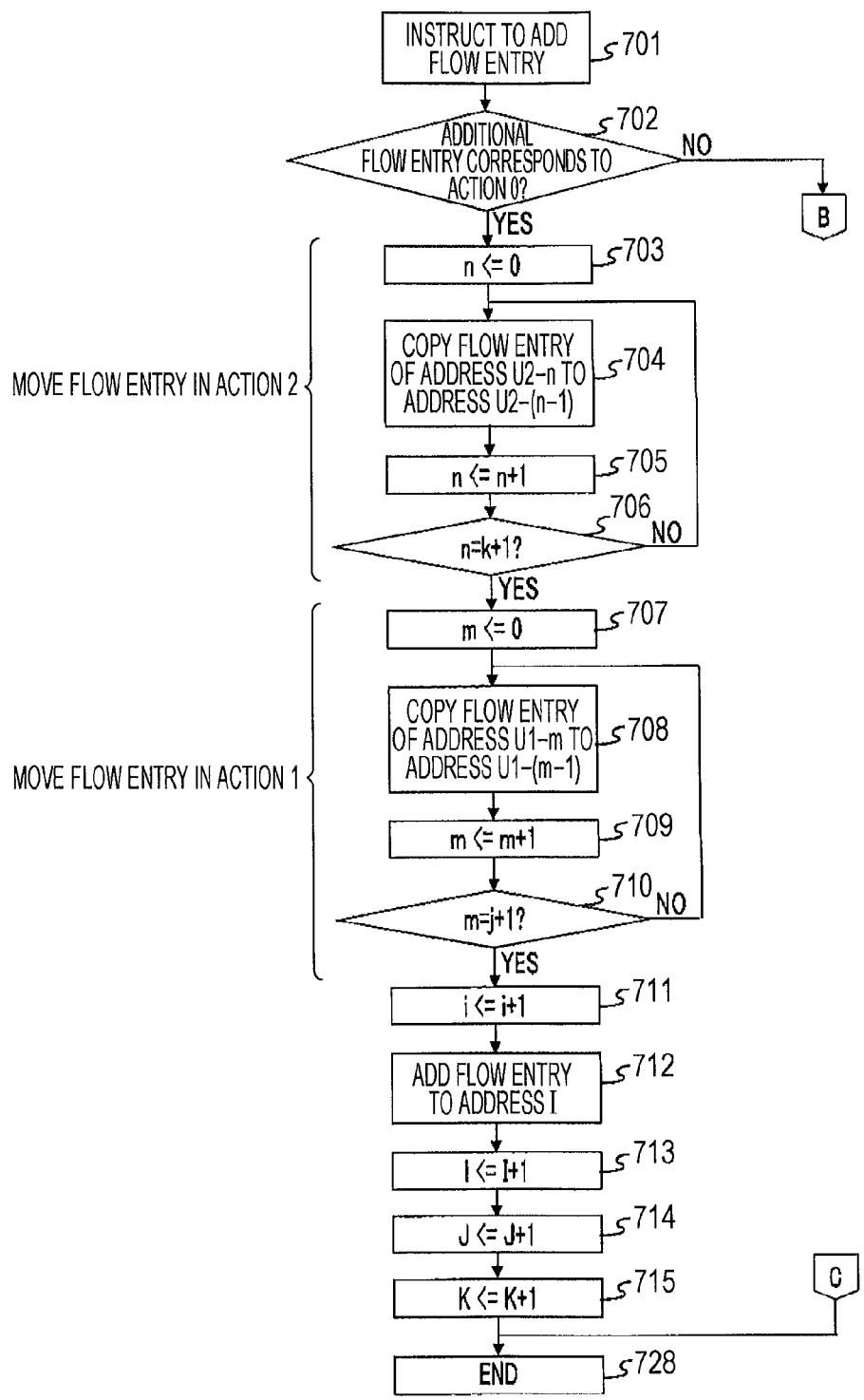
FIG. 14A is the first part of a flowchart illustrating an example of a process for adding a flow entry in the flow table in the embodiment of the present invention.
Figure 14B:
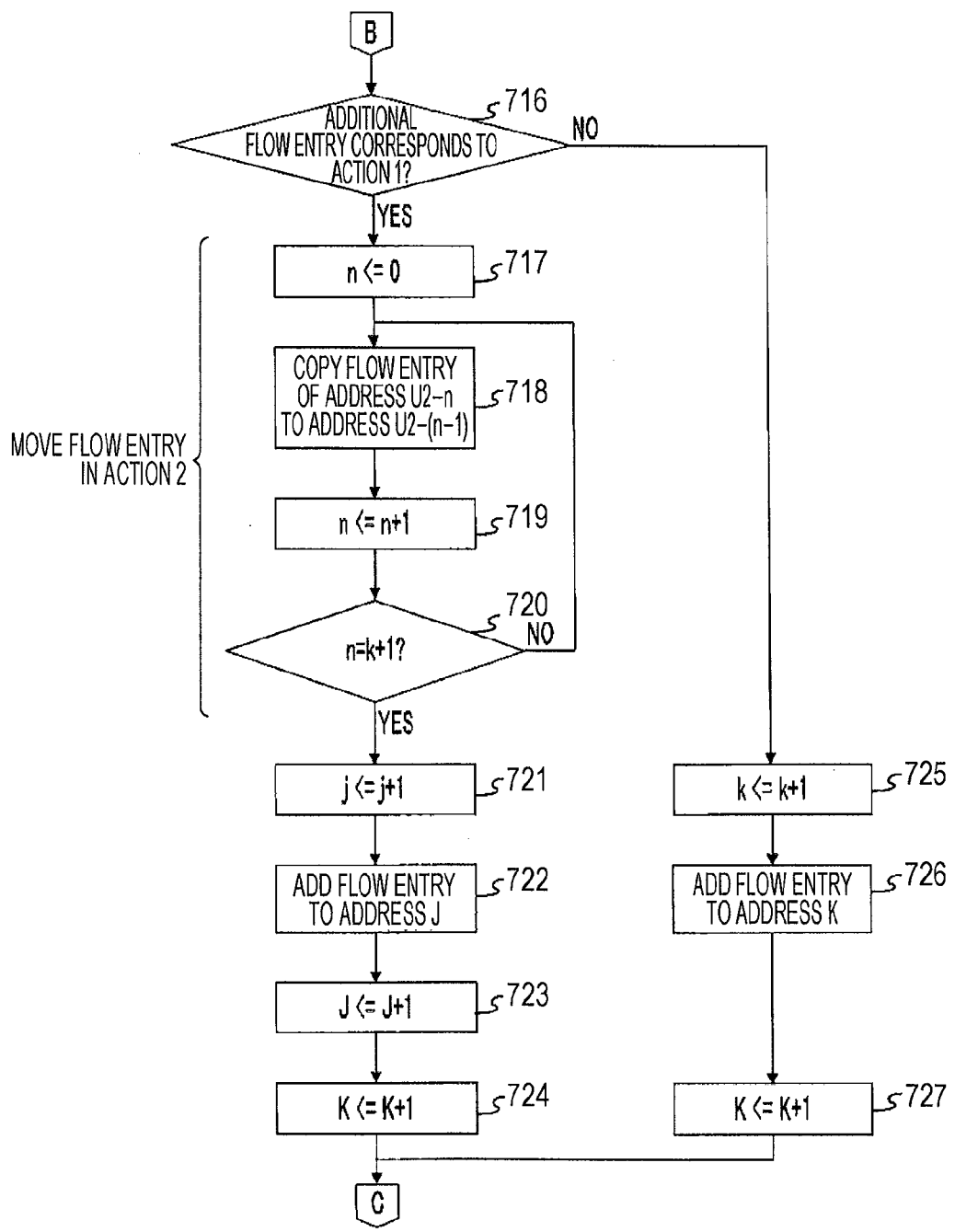
FIG. 14B is the second part of the flowchart illustrating the example of the process for adding a flow entry in the flow table in the embodiment of the present invention.

FIG. 14A and FIG. 14B are flowcharts illustrating an example of a process for adding a flow entry in the flow table in the embodiment of the present invention.

In FIG. 14A and FIG. 14B, the number of flow entries (that is, the number of flow entries in an address range corresponding to an action 0) corresponding to an action 0 is assumed as i. The number of flow entries corresponding to an action 1 is assumed as j. The number of flow entries corresponding to an action 2 is assumed as k. An addition address of the flow entry corresponding to the action 0 is assumed as I. An additional address of the flow entry corresponding to the action 1 is assumed as J. An addition address of the flow entry corresponding to the action 2 is assumed as K. The lower limit address in the address range corresponding to the action 0 is assumed as L0=0. The upper limit address in the address range corresponding to the action 0 is assumed as U0=i. The lower limit address in the address range corresponding to the action 1 is assumed as L1=i+1. The upper limit address in the address range corresponding to the action 1 is assumed as U1=i+j+1. The lower address in the address range corresponding to the action 2 is assumed as L2=i+j+2. The upper limit address in the address range corresponding to the action 2 is assumed as U2=i+j+k+2. Initial values are set as i=0, j=0, k=0, I=0, J=1, and K=2.

Descriptions will now be made to the flow of the process for adding a flow entry, along with FIG. 14A and FIG. 14B. First, an instruction for adding a flow entry is issued (Step 701). This instruction may include information for specifying at least a flow condition to be set in a flow entry to be added and an action (that is, an action corresponding to a flow entry to be added) to be executed when packets satisfying the flow condition are input, and may include also information representing a priority of a flow entry to be added.

The CPU 423 for flow statistics function determines whether the flow entry to be added corresponds to the action 0 (Step 702).

When a determination result in Step 702 is YES, the CPU 423 for flow statistics function assumes n=0 (Step 703). The CPU 423 for flow statistics function copies a flow entry of an address U2-n to an address U2-(n−1) (Step 704). The CPU 423 for flow statistics function adds 1 to n (Step 705). The CPU 423 for flow statistics function determines whether n=k+1 (Step 706). When a determination result in Step 706 is NO, the CPU 423 for flow statistics function repeats procedures from and after Step 704.

When the determination result in Step 706 is YES, the CPU 423 for flow statistics function assumes m=0 (Step 707). The CPU 423 for flow statistics function copies a flow entry of an address U1-m to an address U1-(m−1) (Step 708). The CPU 423 for flow statistics function adds 1 to m (Step 709). The CPU 423 for flow statistics function determines whether m=j+1 (Step 710). When a determination result in Step 710 is NO, the CPU 423 for flow statistics function repeats procedures from and after Step 708.

When the determination result in Step 710 is YES, the CPU 423 for flow statistics function adds 1 to i (Step 711), adds a flow entry to an address I (Step 712), adds 1 to I (Step 713), adds 1 to J (Step 714), and adds 1 to K (Step 715).

When the determination result in Step 702 is NO, the CPU 423 for flow statistics function determines whether an entry to be added corresponds to the action 1 (Step 716). When a determination result in Step 716 is YES, the CPU 423 for flow statistics function assumes n=0 (Step 717). The CPU 423 for flow statistics function copies a flow entry of the address U2-n to the address U2-(n−1) (Step 718). The CPU 423 for flow statistics function adds 1 to n (Step 719). The CPU 423 for flow statistics function determines whether n=k+1 (Step 720). When a determination result in Step 720 is NO, the CPU 423 for flow statistics function repeats procedures from and after 718.

When the determination result in Step 720 is YES, the CPU 423 for flow statistics function adds 1 to j (Step 721), adds a flow entry to an address J (Step 722), adds 1 to J (Step 723), and adds 1 to K (Step 724).

When the determination result in Step 716 is NO, the CPU 423 for flow statistics function adds 1 to k (Step 725), adds a flow entry to an address K (Step 726), and adds 1 to K (Step 727).

Accordingly, the process for adding a flow entry in this embodiment is completed (Step 728).

When at least one of the upper limit value and the lower limit value of the plurality of address ranges is changed through the process of FIG. 14A and FIG. 14B, the CPU 423 for flow statistics function reflects this change into the address range table 421201. This procedure may be executed, for example, in Step 728.

In FIG. 14A and FIG. 14B, when an instruction for adding a flow entry is issued, movement is made onto a flow entry of an address range of a rank following an address range of the flow search CAM 4210 which corresponds to an action corresponding to the flow entry to be added, to an address further following at least by one rank. The specified flow entry is added to the unused address which is generated by this movement. Further, a change in the address range by this movement is reflected into the address range table 421201. As a result, even when a flow entry is added, it is possible to determine the action based on the address range of the flow entry.

When the instruction for adding the flow entry includes information representing a priority of the flow entry to be added, the CPU 423 for flow statistics function may update information representing the priorities of the flow entries held by the packet relay device 4, in accordance with the information. For example, when a flow entry having the same priority as that of the flow entry to be added has already been registered in the information representing the priorities of the flow entries, the CPU moves down the priority of the already-registered flow entry and the priority of the flow entry having a lower priority than that further by one rank, and may add information representing the priority of the flow entry to be added.

Further, when a flow condition set in the flow entry to be added is not exclusive from a flow condition set in any of the already-registered flow entries, it is necessary to change either one of the conditions. This change is performed in accordance with the method described with reference to FIGS. 13A and 13B, based on the updated information representing the priorities of flow entries, and thus will now specifically be described again.

The address ranges may be set to include an unused address in advance. In this case, as long as an unused address remains in the address range into which the flow entry will be added, the specified flow entry to be added may simply be added at the unused address. Therefore, the process illustrated in FIG. 14A and FIG. 14B is not necessarily executed.

Figure 15:
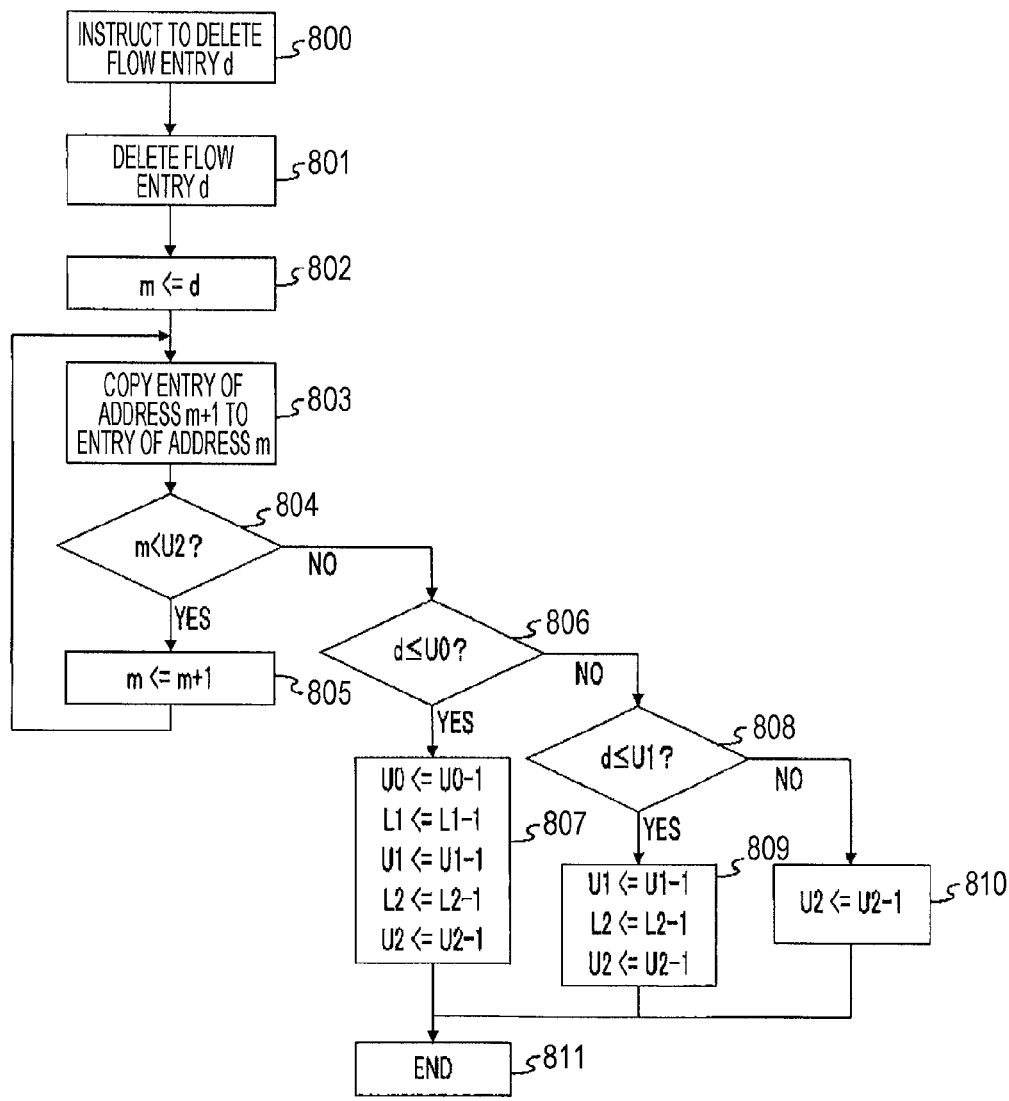
FIG. 15 is a flowchart illustrating an example of a process for deleting a flow entry in the flow table in the embodiment of the present invention.

FIG. 15 is a flowchart illustrating an example of a process for deleting a flow entry in the flow table in the embodiment of the present invention.

First, an instruction for deleting a flow entry d is issued (Step 800). The CPU 423 for flow statistics function deletes a flow entry d (Step 801). The CPU 423 for flow statistics function assumes m=d (Step 802). The CPU 423 for flow statistics function copies a flow entry registered at an address m+1 to an address m (Step 803). The CPU 423 for flow statistics function determines whether m<U2 (Step 804). When a determination result in Step 804 is YES, the CPU 423 for flow statistics function adds 1 to m (Step 805). The CPU 423 for flow statistics function repeats procedures from and after Step 803.

When the determination result in Step 804 is NO, the CPU 423 for flow statistics function determines whether d≤U0 (Step 806). When the determination result in Step 806 is YES, the CPU 423 for flow statistics function subtracts 1 form U0, subtracts 1 from L1, subtracts 1 from U1, subtracts 1 from L2, and subtracts 1 from U2 (Step 807).

When the determination result in Step 806 is NO, the CPU 423 for flow statistics function determines whether d U1 (Step 808). When a determination result in Step 808 is YES, the CPU 423 for flow statistics function subtracts 1 from U1, subtracts 1 from L2, and subtracts 1 from U2 (Step 809). When the determination result in Step 808 is NO, the CPU 423 for flow statistics function subtracts 1 from U2 (Step 810). Accordingly, the process for deleting a flow entry in this embodiment is completed (Step 811).

When a change is made in at least one of the upper limit value and the lower limit value of the plurality of address ranges through the process of FIG. 15, the CPU 423 for flow statistics function reflects this change into the address range table 421201. This process may be executed, for example, in Step 811.

In FIG. 15, when an instruction for deleting a flow entry is issued, movement is made onto a flow entry of an address range in a rank following an address range of the flow search CAM 4210 which corresponds to an action corresponding to the a flow entry to be deleted, to an address preceding that at least by one rank. A change in the address range by this movement is reflected into the address range table 421201. As a result, even when a flow entry is deleted, it is possible to determine the action based on the address range of the flow entry.

When the address ranges are allowed to include an unused address, the address of the deleted flow entry is handled as an unused address. Thus, the process of FIG. 15 is not necessarily executed.

When the movement is made in the flow entries, during the addition or deletion of the flow entries, as illustrated in FIG. 14A, FIG. 14B, and FIG. 15, the number of flow entries to be moved increases, as the target flow entry to be added or deleted is in a preceding rank in the flow search CAM 4210. To reduce the load of the CPU 423 for flow statistics function, the number of flow entries to be moved is preferably small. The CPU 423 for flow statistics function calculates the frequencies of adding/deleting the flow entries respectively corresponding to actions, in association with each other. The movement of the flow entries may be executed, as illustrated in FIG. 13A and FIG. 13B, in a manner that an address range corresponding to an action register specifying an action with the low frequency becomes in a rank preceding an address range corresponding to an action register specifying an action with the high frequency. It can be expected that the number of flow entries to be moved is suppressed, and that the load of the CPU 423 for flow statistics function is reduced.

According to the embodiment of the present invention, the functions requiring the flow search have increased. Even when the number of searches to be executed by one search command has increased, the reading performance of the RAM will not be the bottleneck. Thus, the packet relay device to be maintained without lowering the flow search performance can be realized without installing further RAM.

Descriptions will now be made to a user interface specifying the maximum number of entries in association with each type of action or in association with each flow, in the packet relay device 4. By this user interface, it is possible to specify the available resources for a particular number of entries, based on the importance level on the statistics collection, in association with each type of action or in association with each flow. It is possible to set the upper limit values of the number i of flow entries of the action 0, the number j of flow entries of the action 1, and the number k of flow entries of the action 2, in FIGS. 14A and 14B. The user interface is provided by an input unit of the management terminal 46. The packet relay device 4 sets the maximum number of entries in association with each type of action or in association with each flow, in accordance with the specified maximum number of entries in association with each type of action or each flow.

Examples of the maximum number of entries in association with each type of action or each flow are the maximum number of entries for registration of IPv4 flows specifying the IPv4 flows (maximum number of entries of 421002 in FIG. 2), the maximum number of entries for registration of IPv6 flows specifying the IPv6 flows to be registered in a flow table (maximum number of entries of 421003 in FIG.

2), and the maximum number of entries for registration of non-IP flows specifying non-IP flows to be registered in a flow table (maximum number of entries of 421004 in FIG. 2). When there are a plurality of CPUs performing a registration process, and the registration process is divided thereto, the flows for dividing the registration process for the CPUs can be specified by the entries for flow registration.

When the maximum number of entries is specified in association with each type of action or each flow (the type of rate representing the probability of collecting the statistics is assumed as the type of action), the maximum number of entries as entries for statistics collection is specified. In the entries, the probability control flag 4211001 of the entry 42110 for statistics collection is a value representing that probability control of the statistics collection is performed, and the probability control counter identifiers 4211002 are the same value.

Descriptions will now be made to a specifying method which is performed by a user interface specifying the maximum number of entries in association with each type of action or in association with each flow.

[command for specifying the maximum number of entries in association with each type of action or each flow] [maximum number of entries]-[specify entry type]-[specify target flow]-

The entry type may, for example, be an entry for registration (reg) and an entry for statistics collection (cnt). The entry for registration may be specified using an identifier for identifying the CPU which executes the registration process. This specification may be done using a line including a device which has the CPU executing the registration process or a number of a slot for installing an extension board for installing the CPU executing the registration process thereon. The target flow may be specified using packet header information (for example, a protocol type).

Here are some examples of commands specifying the maximum numbers of entries in association with each protocol type, and which are input by the user interface.

designate_entry_num 10-type reg-prt IPv4 . . . 1801
designate_entry_num 1-type reg-prt IPv6 . . . 1802
designate_entry_num 3-type reg-prt notIP . . . 1803

The command in 1801 is a command (designate_entry_num) specifying ten entries, as the maximum number of entries as the entries for registration (-type reg) of the IPv4 flows (-prt IPv4). The command in 1802 is a command (designate_entry_num) specifying one entry as the maximum number of entries as an entry for registration (-type reg) of the IPv6 flows (-prt IPv6). The command in 1803 is a command (designate_entry_num) specifying three entries as the maximum number of entries as entries for registration (-type reg) of the non-IP flows (prt notIP).

Here are some examples of commands specifying the maximum numbers of entries to be registered in association with each CPU executing the registration process, and which are input by the user interface.

designate_entry_num 10-type reg -cpu 0 . . . 1901
designate_entry_num 1-type reg -cpu 1 . . . 1902
designate_entry_num 3-type reg -cpu 2 . . . 1903

The command in 1901 is a command (designate_entry_num) specifying ten entries as the maximum number of entries as entries for registration (-type reg) of CPU 0 (-cpu 0). The command in 1902 is a command (designate_entry_num) specifying one entry as the maximum number of entries as entries for registration (-type reg) for CPU 1 (-cpu 1). The command in 1903 is a command (designate_entry_num) specifying three entries as the maximum number of entries as entries for registration (-type reg) for CPU 2 (-cpu 2).

Finally, here are some examples of commands specifying the maximum numbers of entries for statistics collection in association with each rate type, and which are input by the user interface.

designate_entry_num 2000-type cnt -prt IPv4-rate 10% . . . 2001
designate_entry_num 4000-type cnt -prt IPv4-rate 5% . . . 2002
designate_entry_num 1000-type cnt -prt IPv6-rate 50% . . . 2003

The command in 2001 is a command (designate_entry_num) specifying 2000 entries as the maximum number of entries as entries for statistics collection (-type cnt) of the IPv4 flows (-prt IPv4) at a rate of 10% (-rate 10%). The command in 2002 is a command (designate_entry_num) specifying 4000 entries as the maximum number of entries as entries for statistics collection (-type cnt) of the IPv4 flows at a rate of 5% (-rate 5%). The command in 2003 is a command (designate_entry_num) specifying 1000 entries as the maximum number of entries as entries for statistics collection (-type cnt) of the IPv6 flows at a rate of 50% (-rate 50%).

When the maximum numbers are set in association with each type of action or each flow, some change may be made in FIG. 14A and FIG. 14B, as follows. The CPU 423 for flow statistics function compares the number i of flow entries having the action 0 with the maximum number imax (to be set) of flow entries with the action 0, in magnitude, when the flow entry to be added has the action 0 (YES in Step 702). When a comparison result is i≤imax, the CPU 423 for flow statistics function performs a process for adding a flow entry (Steps 703 to 715). In the other case, the process is completed, without performing the process for adding the flow entry. In this case, the CPU 423 for flow statistics function may output an alert representing that a flow entry has not been added based on the specified maximum number of flow entries, to a display screen of the management terminal. Similarly, when the flow entry to be added has the action 1 (YES in Step 716), the CPU 423 for flow statistics function compares the number j of flow entries having the action entry 1 with the set maximum number jmax of flow entries having the action 1, in magnitude. When a comparison result is j≤jmax, the CPU 423 for flow statistics function performs a process for adding a flow entry (Steps 717 to 724). In the other case, the process is completed without performing the process for adding a flow entry. Further, when the flow entry to be added has neither the action 0 nor the action 1, the CPU compares the number k of flow entries with the maximum number kmax (to be set) of flow entries in magnitude. When k≤kmax, the CPU performs the process for adding the flow entry (Steps 725 to 727). In the other case, the process is completed without performing the process for adding the flow entry.

The present invention is not limited to the above-described embodiment, and may include various modifications. The above-described embodiment has been described specifically for the sake of easy descriptions of the present invention. Thus, the present invention is not necessarily limited to the embodiments including all the constituent elements described above. A configuration part of one embodiment may be replaced with another configuration part of another embodiment, or a configuration of one embodiment may be added to the configuration of another embodiment. A configuration part of each embodiment may be added to, deleted from, or replaced with another configuration.

The above configurations, functions, processing units, and processing means may be realized using the hardware, by designing it partially or entirely with, for example, an integrated circuit. The above-described configurations or functions may be realized using software, by a processor interpreting and executing programs realizing the functions. The programs, tables, and files realizing the functions may be stored on a storage device (a hard disk drive or an SSD (Solid State Drive)) or a computer readable non-temporary data storage medium (IC card, SD card, or DVD).

The illustrations illustrate control lines and information lines that are considered only as necessary to explain the embodiment. They do not necessarily illustrate the entire control lines and information lines included in the actual products having the present invention applied thereinto. In fact, almost the entire configurations may mutually be connected.

What is claimed is:

1. A packet relay device which relays packets, comprising:
    a packet receiving unit which receives packets from an input line;
    a switch for switching the packets received by the packet receiving unit;
    a packet sending unit which sends the packets switched by the switch, through an output line;
    an associative memory which holds a plurality of flow entries with a set conditions identifying a plurality of flows to which the packets belong, and, when header information of the input packets satisfies a condition among the set conditions of the flow entries, outputs an address of the one of the flow entries with the satisfied condition; and
    a packet search unit which executes an action, from among a plurality of actions, associated with the one of the flows to which the packets belong, based on an output of the associative memory,
    wherein the packet search unit has a plurality of action registers which hold information specifying the plurality of actions to be executed,
    wherein the packet search unit is configured to:
    hold address range information including consecutive address ranges of the associative memory and the action registers in association with each other,
    register the plurality of flow entries with the conditions identifying the flows associated with a same one of the actions at a plurality of addresses in a same address range,
    input the header information of the packets to the associative memory,
    determine an address range including the address output from the associative memory,
    determine the action to be executed for the packets, in accordance with information read out from the one of the action registers corresponding to the determined address range, and
    execute the determined action.

2. The packet relay device according to claim 1, wherein the respective plurality of flow entries are prioritized, and
    wherein the packet search unit is configured to register the plurality of flow entries with the set conditions identifying the flows associated with the same action in the consecutive address ranges of the associative memory, and, when a first flow entry with a set first condition is registered at an address preceding a second flow entry with a higher priority than the first flow entry, as a flow entry with a set second condition, thereby setting, in the first flow entry, a third condition which has been created by excluding an overlapped part of the first condition and the second condition from the first condition.

3. The packet relay device according to claim 2,
    wherein the packet search unit is further configured to:
    specify, when information specifying a new condition for identifying the flow and an action associated with the flow identified with the new condition is input, an address range of the associative memory corresponding to the action specified with the input information, based on the address range information,
    move the flow entry of each of the addresses included in the address range following the specified address range, to a further following address,
    add a new flow entry with the set new condition at an unused address which is generated due to movement of the flow entry,
    update the address range information to reflect the movement of the flow entry and addition of the new flow entry,
    delete the specified flow entry from the associative memory, when information specifying the flow entry to be deleted is input,
    move a flow entry of an address following the deleted flow entry to an address preceding the address, and
    update the address range information to reflect deletion and movement of the flow entry.

4. The packet relay device according to claim 1,
    wherein the packet search unit is further configured to calculate a frequency of adding or deleting a flow entry corresponding to the action in association with each action, and registers the plurality of flow entries in a manner that an address range corresponding to an action register specifying an action with a calculated low frequency precedes, in a rank, an address range corresponding to an action register specifying an action with a calculated high frequency.

5. The packet relay device according to claim 1,
    wherein the plurality of flow entries having conditions identifying a target flow to be monitored.

6. The packet relay device according to claim 1,
    wherein a number of the flow entries that can be registered in the same address range is equal to or lower than a preset number of entries.

7. The packet relay device according to claim 1, further comprising:
    random access memory (RAM), and
    wherein the action register holds information specifying predetermined actions to be executed as the plurality of actions,
    wherein the RAM holds information specifying another action, and
    wherein the packet search unit is configured to execute the determined action from among the actions held in the action register and the RAM.

8. The packet relay device according to claim 1, further comprising:
    a processor; and
    a memory storing instructions that cause the processor to execute the packet receiving unit, the switch, the packet sending unit, and the packet search unit.

9. A packet relay method to be executed by a packet relay device including a packet receiving unit receiving packets from an input line, a switch for switching the packets received by the packet receiving unit, and a packet sending unit sending the packets switched by the switch through an output line, the method comprising:
- holding a plurality of flow entries with set conditions identifying a plurality of flows of packets including conditions identifying target flows to be monitored, in an associative memory;
- holding address range information including consecutive address ranges of the associative memory and a plurality of action registers holding information specifying a plurality of actions to be executed;
- registering the plurality of flow entries with set conditions identifying the flows associated with a same one of the actions, at a plurality of addresses in a same address range;
- inputting header information of the received packets to the associative memory;
- outputting, when the header information of the input packets satisfies a condition among the set conditions of the flow entries, an address of the one of the flow entries with the satisfied condition;
- determining an address range including an address output from the associative memory;
- determining an action to be executed in association with the received packets, in accordance with information read out from the one of the action registers corresponding to the determined address range; and
- executing the determined action for the received packets.

10. The packet relay method according to claim 9,
wherein the respective plurality of flow entries are prioritized, and
wherein the registering includes:
registering the plurality of flow entries with the set conditions identifying the flows associated with the same action in the consecutive address ranges of the associative memory, and, when a first flow entry with a set first condition is registered at an address preceding a second flow entry with a higher priority than the first flow entry, as a flow entry with a set second condition, thereby setting, in the first flow entry, a third condition which has been created by excluding an overlapped part of the first condition and the second condition from the first condition.

11. The packet relay method according to claim 8,
wherein the registering further includes:
specifying, when information specifying a new condition identifying the flow and an action associated with the flow identified by the new condition is input, an address range of the associative memory corresponding to the action specified with the input information based on the address range information,
moving the flow entry of each address included in an address range following the specified address range to a further following address,
adding a new flow entry with the new set condition to an unused address which is generated by movement of the flow entry, and
updating the address range information to reflect the movement of the flow entry and addition of the new flow entry,
deleting the specified flow entry from the associative memory, when information specifying the flow entry to be deleted is input,
moving a flow entry of an address following the deleted flow entry to a preceding address, and
updating the address range information to reflect deletion and movement of the flow entry.

12. The packet relay method according to claim 9,
wherein the registering further includes:
calculating a frequency of adding or deleting a flow entry corresponding to the action in association with each other, and registering the plurality of flow entries in a manner that an address range corresponding to an action register specifying an action with a calculated low frequency precedes, in a rank, an address range corresponding to an action register specifying an action with a calculated high frequency.

* * * * *